(12) United States Patent
Taira et al.

(10) Patent No.: US 7,194,193 B2
(45) Date of Patent: Mar. 20, 2007

(54) MULTI-STANDARD INFORMATION MIXED RECORDING/MANAGEMENT SYSTEM

(75) Inventors: Kazuhiko Taira, Yokohama (JP); Hideki Mimura, Yokohama (JP); Yasufumi Tsumagari, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1305 days.

(21) Appl. No.: 09/944,374

(22) Filed: Sep. 4, 2001

(65) Prior Publication Data
US 2002/0035575 A1 Mar. 21, 2002

(30) Foreign Application Priority Data
Sep. 20, 2000 (JP) ............................. 2000-285489

(51) Int. Cl.
*H04N 5/91* (2006.01)
(52) U.S. Cl. ...................... 386/95; 386/125; 386/126
(58) Field of Classification Search ................. 386/46, 386/52, 95, 96, 98, 70, 126; 369/59.23
See application file for complete search history.

(56) References Cited

U.S. PATENT DOCUMENTS 6,049,517 A * 4/2000 Tsutsui ................... 369/59.23
6,308,006 B1 * 10/2001 Yamamoto et al. ........... 386/96
6,931,200 B1 * 8/2005 Yamada et al. .............. 386/95
2002/0076202 A1 * 6/2002 Tsumagari et al. ........... 386/70

FOREIGN PATENT DOCUMENTS

| JP | 10-22935 | 1/1998 |
| JP | 11-265563 | 9/1999 |
| JP | 11-273262 | 10/1999 |
| JP | 2000-21082 | 1/2000 |
| JP | 2000-187963 | 7/2000 |

* cited by examiner

*Primary Examiner*—Huy Nguyen
(74) *Attorney, Agent, or Firm*—Oblon, Spivak, McClelland, Maier & Neustadt, P.C.

(57) ABSTRACT

An information medium provided to record multi-standard data managed in units of files by file management information. In the medium, integrated management information that integrates and manages mixed reproduction of the multi-standard data can be recorded.

12 Claims, 16 Drawing Sheets

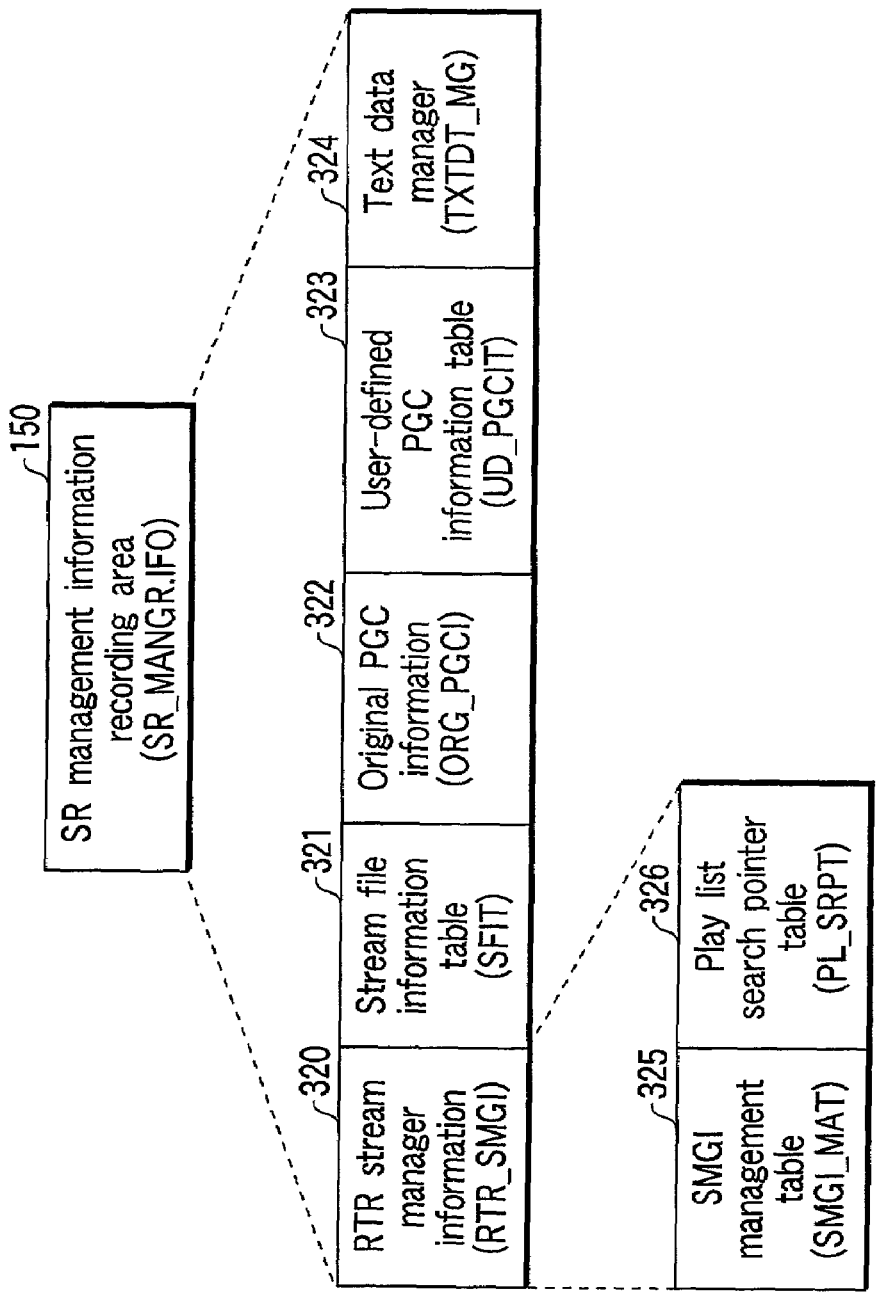
F I G. 5

MULTI-STANDARD INFORMATION MIXED RECORDING/MANAGEMENT SYSTEM

CROSS-REFERENCE TO RELATED APPLICATIONS

This application is based upon and claims the benefit of priority from the prior Japanese Patent Application No. 2000-285489, filed on Sep. 20, 2000, the entire contents of which are incorporated herein by reference.

BACKGROUND OF THE INVENTION

The present invention relates to a multi-standard information mixed recording/management system.

In recent years, many DVD video players and DVD video discs that record contents such as movies and the like, which comply with the DVD standards of read-only discs issued from the DVD Forum on August 1996 are commercially available, and are getting popular at home.

Also, the standardization of application standards for DVD recording using DVD-RAM (rewritable) discs or DVD-RW (re-recordable) discs that allow recording/reproduction is complete or underway recently.

The application standards for DVD recording include three different or heterogeneous application standards, i.e., the DVD video recording (DVD-VR) standards which have already been standardized and have begun to be applied to products from the end of 1999, DVD stream recording (DVD-SR) standards, future application of which to products is expected, and DVD audio recording (DVD-AR) standards, standardization of which is now being hatched.

However, these three application standards have no link information among them and do not specify to confirm the presence of a plurality of pieces of multi-standard contents information and to integrate and reproduce them, since they are independently standardized, although contents specified by these DVD recording standards can be mixed on a single disc.

BRIEF SUMMARY OF THE INVENTION

An information medium used in the multi-standard information mixed recording management system according to an aspect of the present invention can record together multi-standard data managed in units of files by file management information. This information medium can record integrated management information that integrates and manages mixed reproduction of the multi-standard data.

The integrated management information may be a file managed by the file management information.

A data processing method used in the multi-standard information mixed recording management system according to an aspect of the present invention may use an information medium on which multi-standard data managed in units of files by file management information are recorded together. This data processing method may comprise: reading out the file management information from the information medium; extracting directory information of data files recorded in the information medium from the readout file management information, and storing the directory information; checking a file type in specific directory information from the stored directory information; and outputting, if it is determined as a result of checking that no less than two different multi-standard data files are present, information indicating that the multi-standard data are recorded together on the information medium.

BRIEF DESCRIPTION OF THE SEVERAL VIEWS OF THE DRAWING

The accompanying drawings, which are incorporated in and constitute a part of the specification, illustrate presently embodiments of the invention, and together with the general description given above and the detailed description of the embodiments given below, serve to explain the principles of the invention.

FIG. 5 is a view for explaining the internal data structure of an SR management information recording area (corresponding to an SR_MANGR.IFO file in FIG. 2) for stream recording standards, which is recorded in the audio-video related information recording area in the information storage medium shown in FIG. 1;

DETAILED DESCRIPTION OF THE INVENTION

A multi-standard information mixed recording/management system according to an embodiment of the present invention will be described hereinafter with reference to the accompanying drawings.

Figure 1:
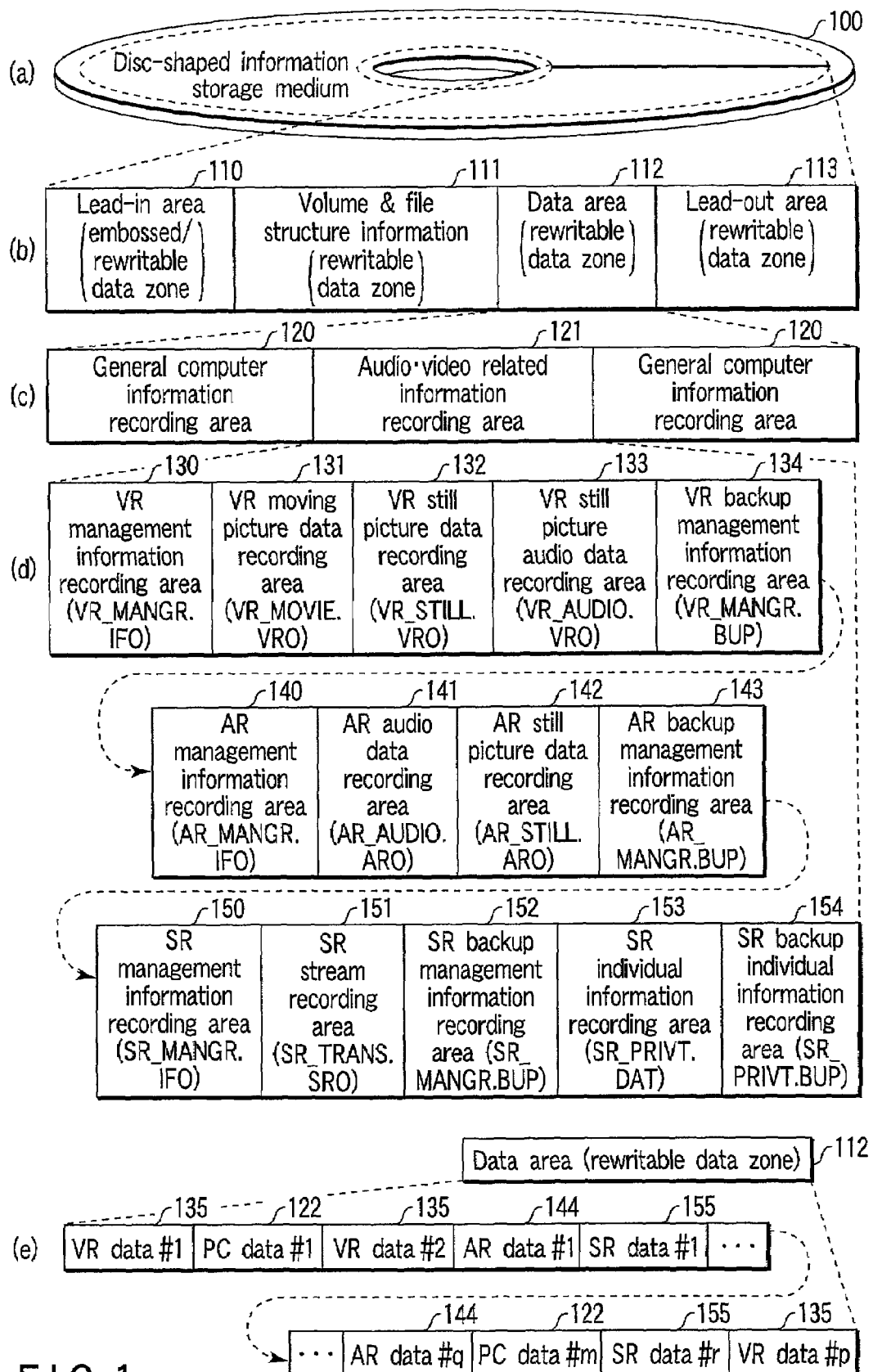
FIG. 1 is a view for explaining the data structure of an information storage medium (DVD-RAM, DVD-RW, DVD-R, HDD, or the like) that can be used in a multi-standard information mixed recording/management system according to an embodiment of the present invention.

FIG. 1 is a view for explaining the data structure of information storage medium 100 (DVD-RAM, DVD-RW, DVD-R, HDD, or the like) that can be used in a multi-standard information mixed recording/management system according to an embodiment of the present invention.

Rewritable, disk-shaped information storage medium (DVD-RAM disc, DVD-RW disc, or the like) 100 shown in FIG. 1(a) has lead-in area 110, volume & file structure information 111, data area 112, and lead-out area 113, as shown in FIG. 1(b).

Data area 112 shown in FIG. 1(b) has a format that allows to store general computer information recording areas 120 and audio-video related information recording area 121 together, as shown in FIG. 1(c).

Audio-video related information recording area 121 in FIG. 1(c) can record together audio-video contents information specified by respective DVD recording standards, i.e., the DVD-VR (video recording), DVD-AR (audio recording), and DVD-SR (stream recording) standards, as shown in FIG. 1(d).

That is, audio-video related information recording area 121 can record reproduction objects of VR moving picture data recording area 131 of moving picture contents information, VR still picture data recording area 132 of still picture contents information, and VR still picture audio data recording area 133 of still picture audio contents information specified by the DVD-VR (video recording) standards, VR management information recording area 130 for managing these reproduction objects, and VR backup management information recording area 134 of backup management information having the same contents as VR management information recording area 130.

Also, audio-video related information recording area 121 can record reproduction objects of AR audio data recording area 141 of audio contents information and AR still picture data recording area 142 of still picture contents information specified by the DVD-AR (audio recording) standards, AR management information recording area 140 for managing these reproduction objects, and AR backup management information recording area 143 of backup management information having the same contents as AR management information recording area 140.

Furthermore, audio-video related information recording area 121 can record reproduction objects of SR stream recording area 151 of stream contents information specified by the DVD-SR (stream recording) standards, SR management information recording area 150 for managing these reproduction objects, and SR backup management information recording area 152 of backup management information having the same contents as SR management information recording area 150.

Moreover, audio-video related information recording area 121 can record SR individual information recording area 153 that can describe apparatus unique information complying with the DVD-SR standards, and SR backup individual information recording area 154 of backup management information having the same contents as SR individual information recording area 153.

FIGS. 1(c) and 1(d) help easy understanding of kinds of information to be recorded in data area 112 of information storage medium 100. In practice, as shown in FIG. 1(e), it is a common practice to alternatively interleave-record respective information as a chain of file segments (VR data 135, AR data 144, and SR data 155) of files specified by the respective DVD recording standards together with PC files (PC data 122) recorded on general computer information recording area 120.

Figure 2:
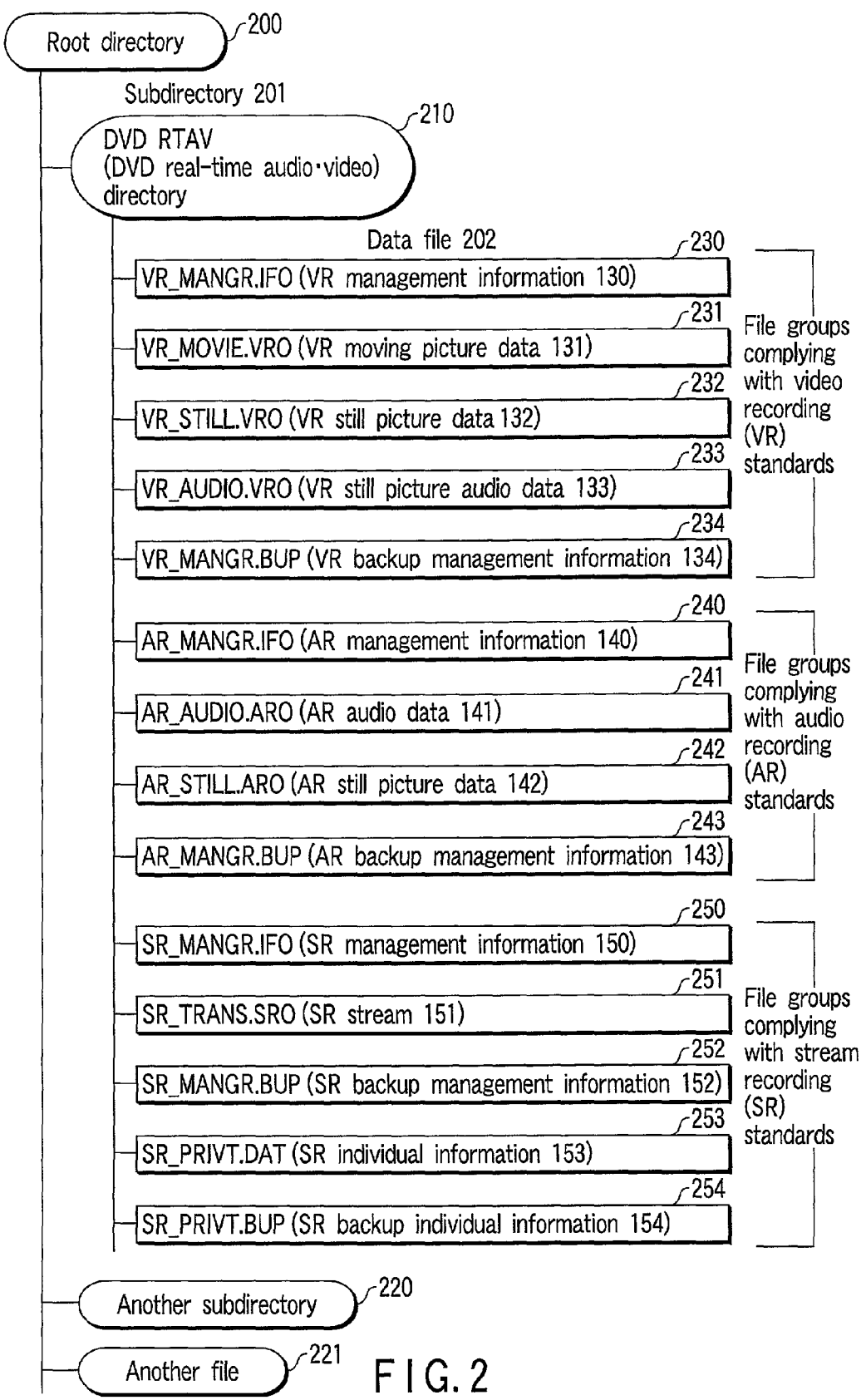
FIG. 2 is a view showing an example of the directory structure of files which are recorded in volume & file structure information in the information storage medium shown in FIG. 1, and are specified by three different DVD recording standards (VR/AR/SR standards)

FIG. 2 shows an example of the directory structure of files which are recorded in volume & file structure information in information storage medium 100 shown in FIG. 1, and are specified by three different DVD recording standards (VR/AR/SR standards).

As shown in FIG. 2, DVD-RTAV directory 210, other subdirectories 220 indicating directories other than DVD-RTAV, and other files 221 can be allocated under root directory 200.

Subdirectory 201 stores data file 202 containing files 230 to 234 complying with the DVD-VR standards, files 240 to 243 complying with the DVD-AR standards, and files 250 to 254 complying with the DVD-SR standards.

In the embodiment of the present invention, files located under DVD-RTAV directory 210 specified by a plurality of kinds of DVD recording standards (VR/AR/SR) can be used.

Figure 3:
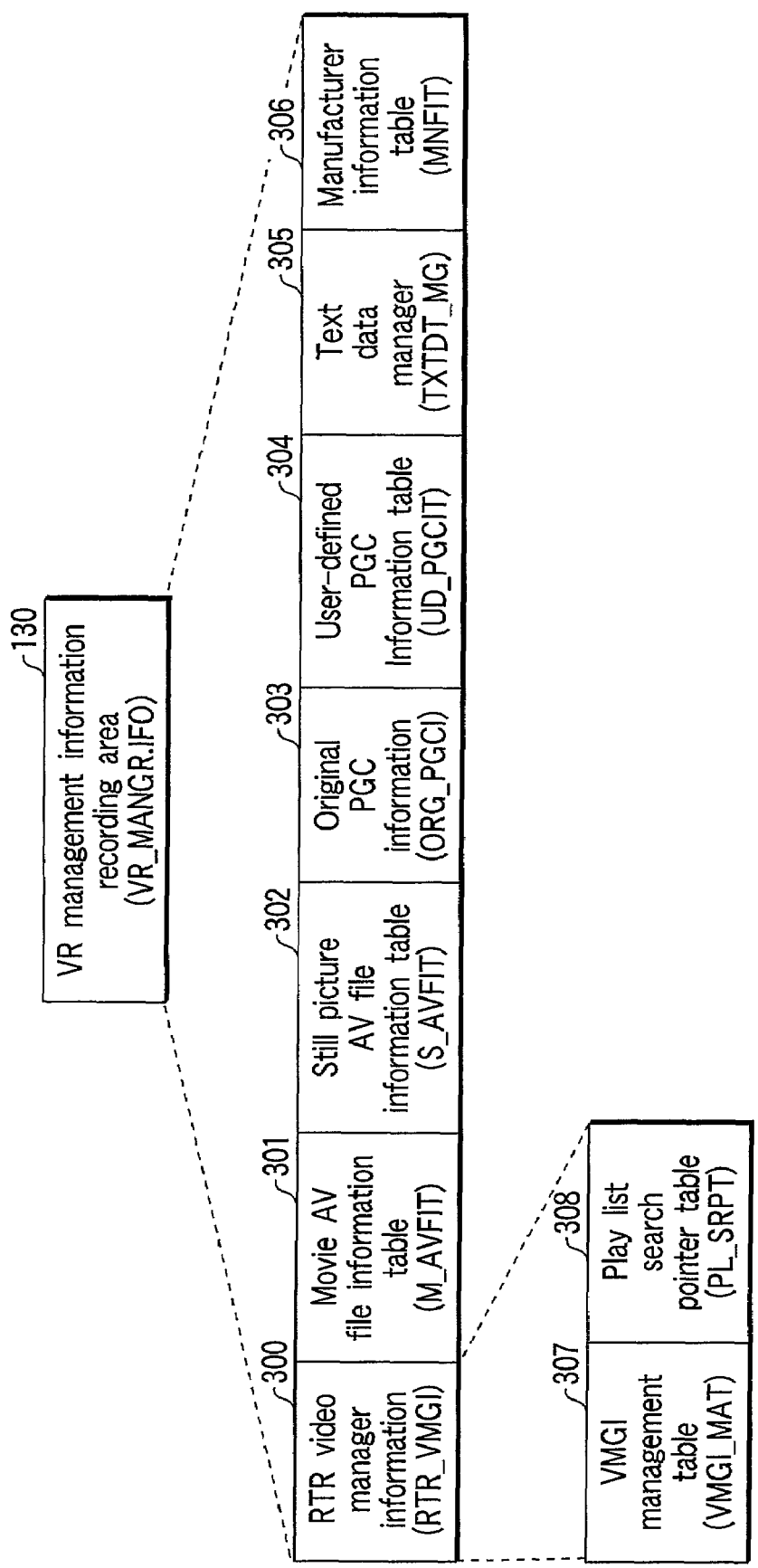
FIG. 3 is a view for explaining the internal data structure of a VR management information recording area (corresponding to a VR_MANGR.IFO file in FIG. 2) for video recording standards, which is recorded in an audio-video related information recording area in the information storage medium shown in FIG. 1.
Figure 4:
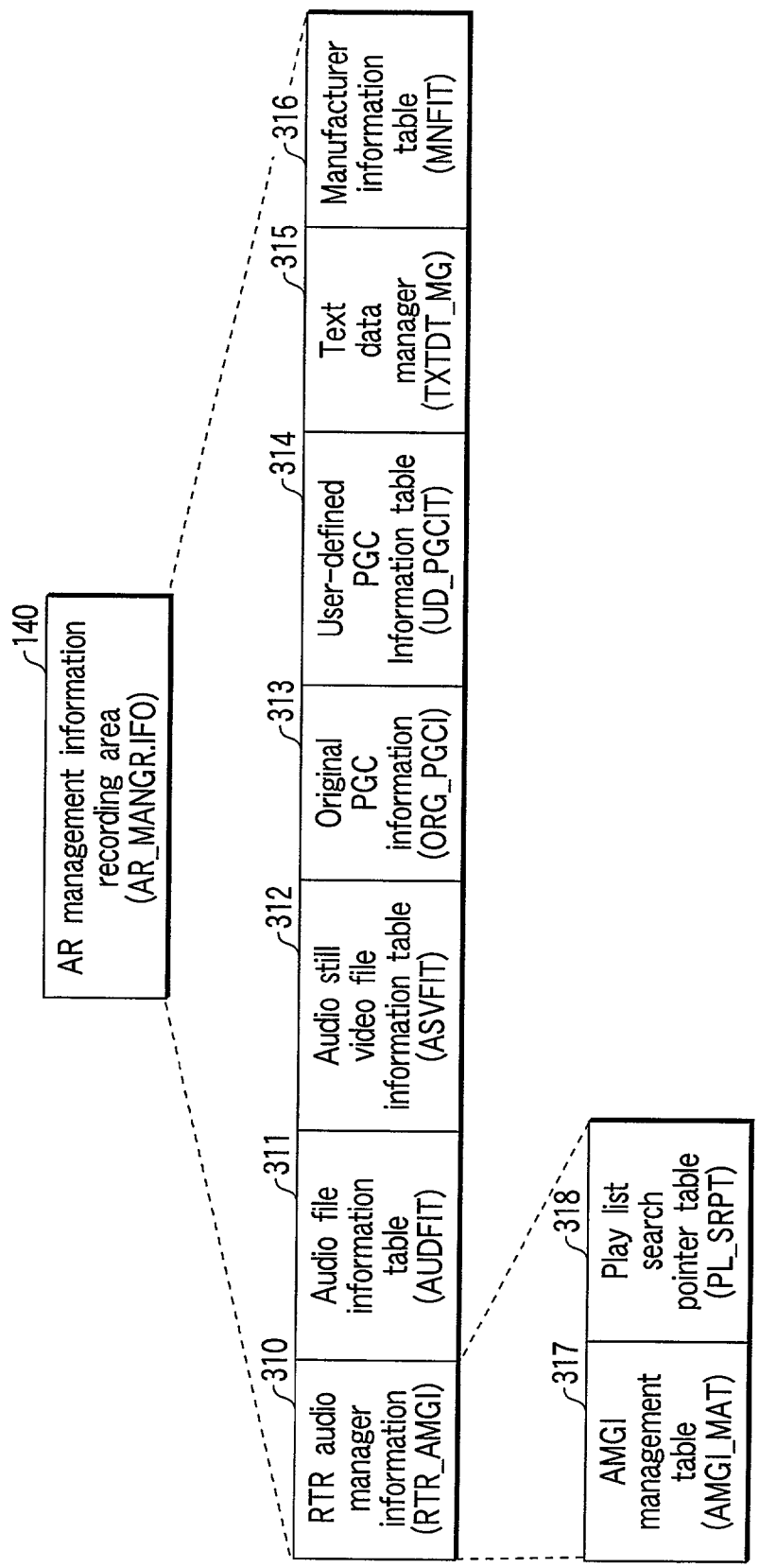
FIG. 4 is a view for explaining the internal data structure of an AR management information recording area (corresponding to an AR_MANGR.IFO file in FIG. 2) for audio recording standards, which is recorded in the audio-video related information recording area in the information storage medium shown in FIG. 1.

FIGS. 3 to 5 show examples of the data structures of management information of the three different DVD recording standards (VR/AR/SR).

FIG. 3 is a view for explaining the internal data structure of VR management information recording area 130 (corresponding to VR_MANGR.IFO file 230 or its backup file VR_MANGR.BUP 234 in FIG. 2) for video recording standards, which is recorded in audio-video related information recording area 121 in information storage medium 100 shown in FIG. 1.

Referring to FIG. 3, RTR video manager information 300 is an information area that manages the entire VR management information stored in VR_MANGR.IFO 230. Movie AV file information table 301 is an information area for managing VR moving picture data stored in VR_MOVIE.VRO file 231. Still picture AV file information table 302 is an information area for managing VR still picture data and still picture audio data stored in VR_STILL.VRO file 232 and VR_AUDIO.VRO file 233.

Original PGC (program chain) information 303 is a reproduction control information area containing the reproduction order of all VR moving picture data, still picture data, and still picture audio data recorded. User-defined PGC information table 304 is a reproduction control information area in which the user freely combines scenes of his or her choice to specify their reproduction order. Text data manager 305 is a text information area that pertains to recorded contents. Manufacturer information table 306 is an information area where manufacturer unique information can be freely recorded.

FIG. 4 is a view for explaining the internal data structure of AR management information recording area 140 (corresponding to AR_MANGR.IFO file 240 or its backup file AR_MANGR.BUP 243 in FIG. 2) for audio recording standards, which is recorded in audio-video related information recording area 121 in information storage medium 100 shown in FIG. 1.

Referring to FIG. 4, RTR audio manager 310 is an information area for managing the entire AR management information stored in AR_MANGR.IFO 240. Audio file information table 311 is an information area for managing AR audio data stored in AR_AUDIO.ARO file 241. Audio still video file information table 312 is an information area for managing AR still picture data stored in AR_STILL.ARO file 242.

Original PGC information 313 is a reproduction control information area containing the reproduction order of all AR audio data and still picture data recorded. User-defined PGC information table 314 is a reproduction control information area where the user freely combines bars of his or her choice to specify their reproduction order. Text data manager 315 is a text information area that pertains to recorded contents. Manufacturer information table 316 is an information area where manufacturer unique information can be freely recorded.

FIG. 5 is a view for explaining the internal data structure of SR management information recording area 150 (corresponding to SR_MANGR.IFO file 250 or its backup file SR_MANGR.BUP 252 in FIG. 2) for stream recording standards, which is recorded in audio-video related information recording area 121 in information storage medium 100 shown in FIG. 1.

Referring to FIG. 5, RTR stream manager information 320 is an information area for managing the entire SR management information stored in SR_MANGR.IFO 250. Stream file information table 321 is an information area for managing SR stream data stored in SR_STREAM.SRO file 251.

Original PGC information 322 is a reproduction control information area containing the reproduction order of all SR stream data recorded. User-defined PGC information table 323 is a reproduction control information area where the user can freely combine scenes of his or her choice to specify their reproduction order. Text data manager 324 is a text information area that pertains to recorded contents.

As shown in FIGS. 3 to 5, the DVD-VR, DVD-AR, and DVD-SR standards have, as reproduction control information for reproducing contents information specified by the respective DVD recording standards, original PGC information 303/313/322, user-defined PGC information 304/314/323, and play list search pointer table 308/318/326, which have a common data structure. These pieces of information which have a common structure are recorded in management information recording areas 130, 140, and 150 of the DVD-VR, DVD-AR, and DVD-SR standards.

Reproduction control information stored in each of original PGC information 303/313/322 and user-defined PGC information 304/314/323 has a program chain data structure (PGC data structure) as a basic unit of reproduction control with compatibility among the DVD standards.

Figure 6:
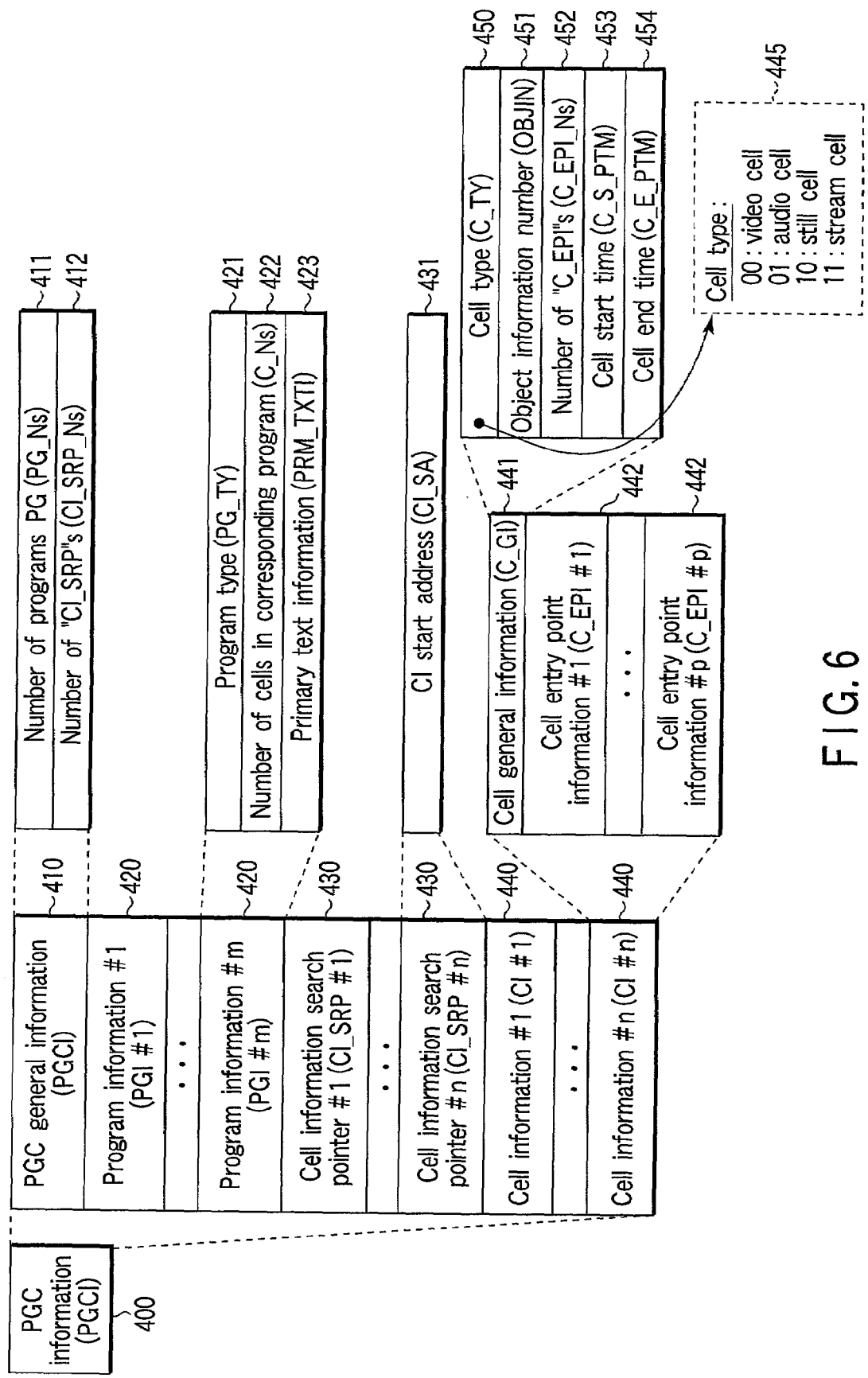
FIG. 6 is a view for explaining the internal data structure of program chain information (PGCI) as a basic unit of contents reproduction control with compatibility among three different DVD standards (VR/AR/SR standards)

FIG. 6 is a view for explaining the internal data structure of program chain information (PGCI) as a basic unit of contents reproduction control with compatibility among three different DVD standards (VR/AR/SR standards).

Referring to FIG. 6, information indicating reproduction sequence of contents information is recorded in program chain information (PGCI) 400. Note that a minimum basic unit of contents information to be seamlessly reproduced is called a "cell", and a sequence of "cells" forms a PGC (program chain) as the reproduction sequence.

PGC information 400 is comprised of: PGC general information 410 having information indicating number of programs 411 and number of cells 412 contained in that PGC; a plurality of pieces of program information 420 each having program type 421, number of cells 422 contained in a program, and text information 423; cell information search pointers 430 each having CI start address 431 indicating the start position of that cell information; and a plurality of pieces of cell information 440 as reproduction information indicating reproduction periods of contents information.

However, user-defined PGC information is comprised of only cell information 440 as reproduction information indicating a reproduction period of contents information, and a sequence of a group of a plurality of pieces of cell information 440 indicating their reproduction order, but does not contain any program information 420.

Each cell information 440 contains cell general information 441 as information that pertains to the entire cell information, and a plurality of pieces of cell entry point information 442 each indicating a reproduction cell entry point in a cell.

Cell general information 441 contains cell type 450 as information indicating contents type (video/audio/still picture/stream: 455) of a cell to be reproduced, object information number 451 of contents information to be actually reproduced, number of entry points 452 contained in a cell, cell start time (or start position) 453, and cell end time (or end position) 454.

Figure 7:
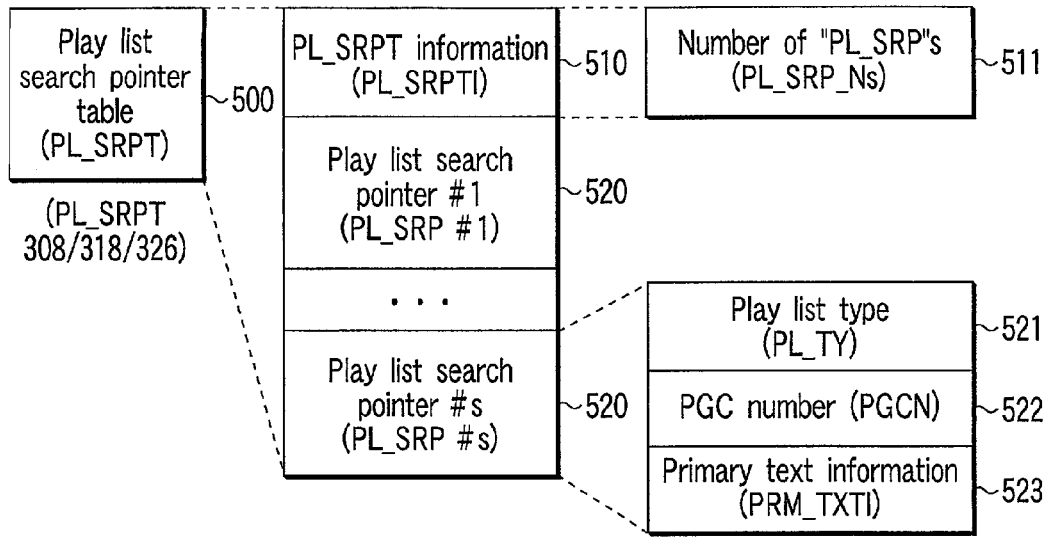
FIG. 7 is a view for explaining the internal data structure of a play list search pointer table (PL_SRPT) as contents reproduction control information with compatibility among three different DVD standards (VR/AR/SR standards)
Figure 8:
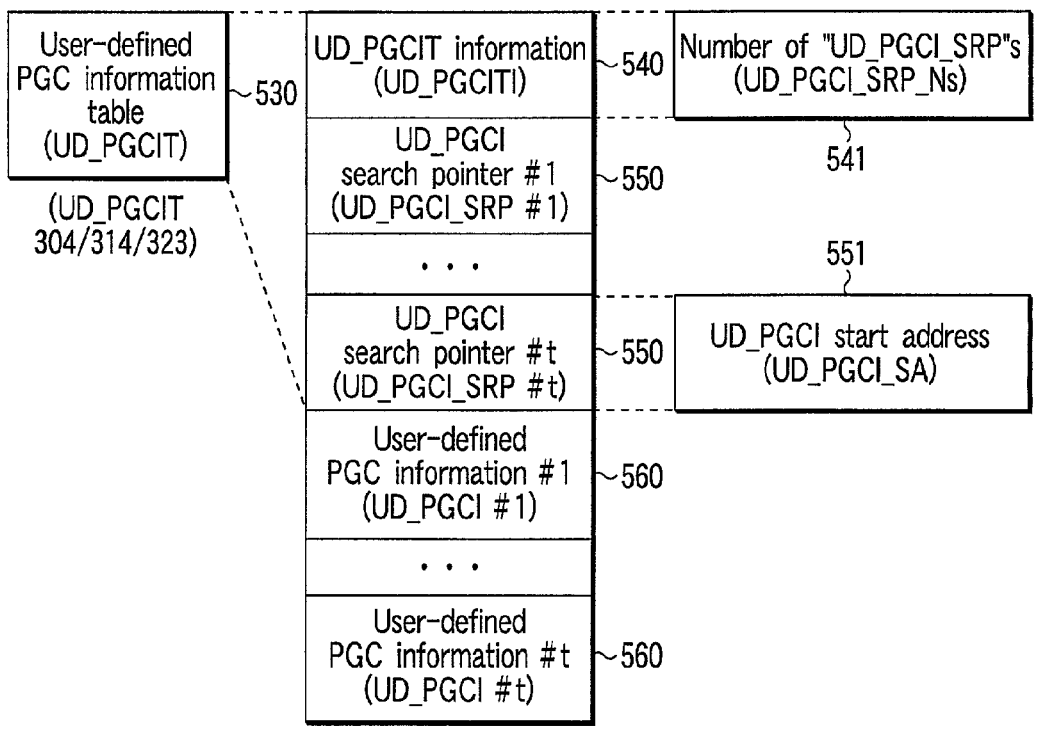
FIG. 8 is a view for explaining the internal data structure of a user-defined PGC information table (UD_PGCIT) as contents reproduction control information with compatibility among three different DVD standards (VR/AR/SR standards)

FIGS. 7 and 8 show an example of the data structure of the play list and user-defined PGC information of reproduction control information having compatibility in terms of the data structure among the DVD standards.

FIG. 7 is a view for explaining the internal data structure of the play list search pointer table (PL_SRPT) as contents reproduction control information with compatibility among three different DVD standards (VR/AR/SR standards).

As shown in FIG. 7, play list search pointer table 500 contains play list search pointer table information (PL_SRPTI) 510, and one or more play list search pointers (PL_SRP#1 to PL_SRP#S) 520.

Note that PL_SRPTI 510 has PL_SRP_Ns 511 indicating the number of play lists that the user can select for reproduction. Each PL_SRP 520 has play list type (PL_TY) 521 indicating contents information (video/audio/still picture/stream/hybrid) of each play list, PGC number (PGCN) 522 of user-defined PGC information 560 contained in user-defined PGC information table 530 reproduced by each play list, and primary text information (PRM_TXTI) 523 that pertains to each play list.

FIG. 7 is a view for explaining the internal data structure of the user-defined PGC information table (UD_PGCIT) as contents reproduction control information with compatibility among three different DVD standards (VR/AR/SR standards).

As shown in FIG. 8, user-defined PGC information table 530 contains user-defined PGC information table information (UD_PGCITI) 540, one or more user-defined PGC information search pointers (UD_PGCI_SRP#1 to UD_PGCI_SRP#t) 550, and one or more pieces of user-defined PGC information (UD_PGCI#1 to UD_PGCI#t) 560.

Note that UD_PGCITI 540 has number of pieces of user-defined PGC information (UD_PGCI_SRP_Ns) 541 contained in the table. Each UD_PGCI_SRP 550 has start position (UD_PGCI_SA) 551 of corresponding user-defined PGC information.

Figure 9:
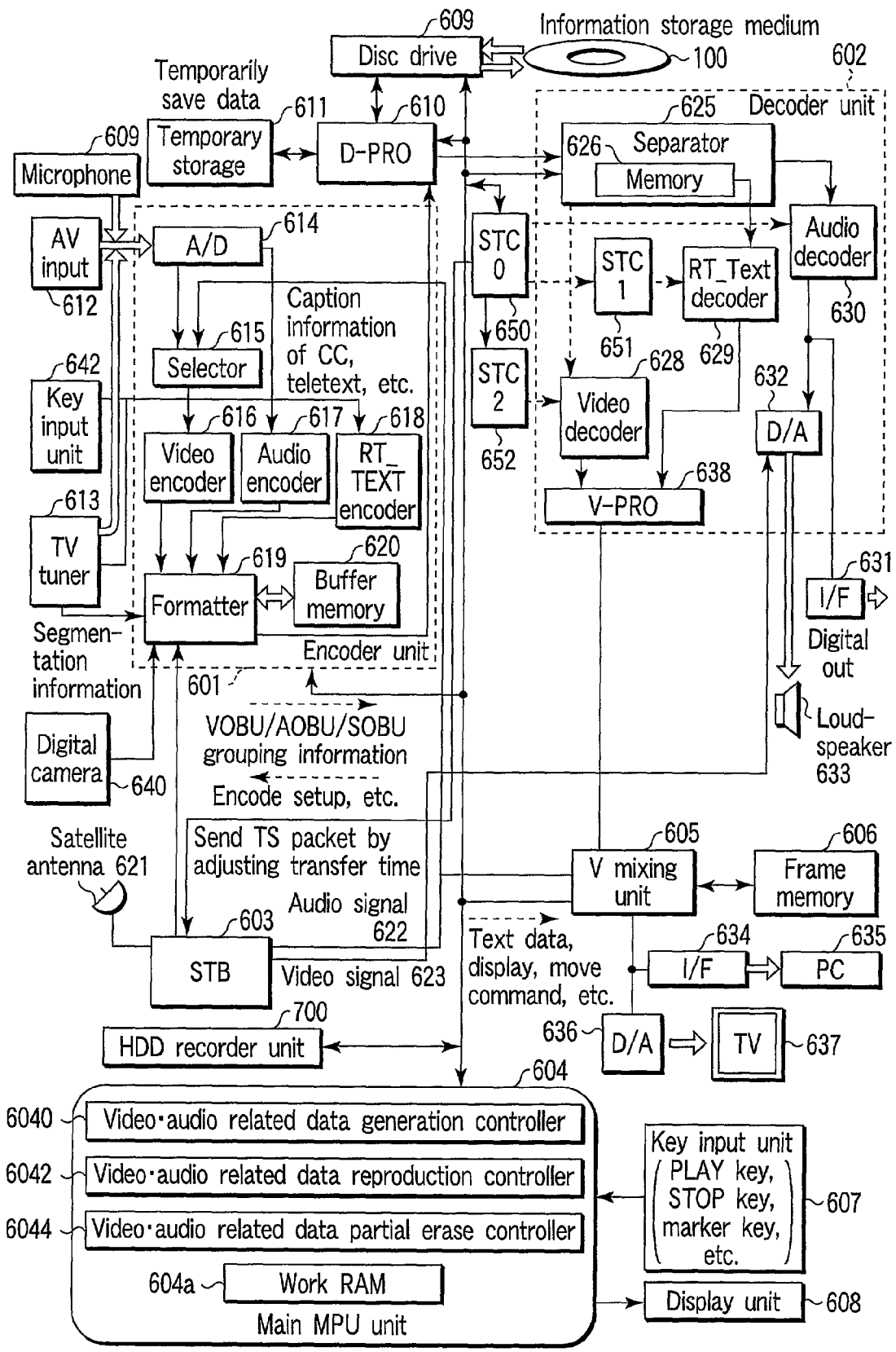
FIG. 9 is a block diagram for explaining the arrangement of a recording/reproduction apparatus for recording a plurality of kinds of multi-standard (VR/AR/SR standards) contents information (VR/AR/SR data) managed in units of files, and their contents management information (VR/AR/SR management information) together on the information storage medium shown in, e.g., FIG. 1, and reproducing the multi-standard contents information recorded together from this medium.

FIG. 9 is a block diagram for explaining the arrangement of a recording/reproduction apparatus for recording a plurality of kinds of multi-standard (VR/AR/SR standards) contents information (VR/AR/SR data) managed in units of files, and their contents management information (VR/AR/SR management information) together on information storage medium 100 shown in, e.g., FIG. 1 (or HDD recorder unit 700), and reproducing the multi-standard contents information (VR/AR/SR data) recorded together from this medium 100 (HDD 700).

An outline of the operation of the apparatus shown in FIG. 9 is as follows. That is, disc drive 609 records and reproduces information on and from information storage medium 100. Various kinds of contents information input from various input units 640 to 642, 612, and 613 are encoded by encoder unit 601, and are recorded on information storage medium 100 via disc drive 609. At the same time, management information which pertains to that object information is generated inside main MPU unit 604, and is recorded on information storage medium 100 via disc drive 609.

Upon reproduction, management information recorded in information storage medium 100 is temporarily recorded in work RAM 604a in main MPU unit 604 via disc drive 609. Using the management information temporarily recorded in work RAM 604a, contents information to be reproduced recorded on information storage medium 100 is read, is decoded by decoder unit 602, and is output to loudspeaker 633, TV 637, or display unit 608.

An outline of the arrangement of the apparatus shown in FIG. 9 is as follows. That is, the apparatus main body of an RTR-DVD video recorder shown in FIG. 9 is roughly constructed by set top box (STB) 603 that incorporates a digital broadcast tuner, disc drive 609 for rotating recordable/reproducible optical disc 100 such as a DVD-RAM, DVD-RW, DVD-R, or the like, and executing read/write processes of information on/from this disc 100, encoder unit 601 that constitutes the recording system, decoder unit 602 that constitutes the reproduction system, and main MPU unit 604 for controlling the operation of the entire apparatus.

Furthermore, to a data bus that connects disc drive 609 and main MPU unit 604, recorder unit 700 that uses a large-capacity (e.g., 30 GB to 100 GB or more), high-speed (data transfer rate is equal to or higher than that of an IEEE1394 serial bus; more specifically, 400 Mbps to 500 Mbps class) hard disk drive (HDD) can be connected.

Large-capacity, high-speed HDD recorder unit 700 is not always necessary depending on an embodiment of the present invention. However, when disc drive 609 such as a DVD-RAM or the like and HDD recorder unit 700 are integrated, the following operations can be made.

More specifically, digital TV broadcast programs and the like are air-checked using HDD recorder unit 700. If the air-checked programs contain some programs (non-copy-protected program contents) that the user does not want to erase, these programs are appropriately joined and edited, and are then copied (backed up) onto a DVD-RAM, DVD-RW, or DVD-R disc. In this way, desired programs air-checked using HDD recorder unit 700 can be permanently saved, while contents copied onto the disc can be erased from HDD recorder unit 700 (by, e.g., moving copied program icons to a trash icon). As a result, an extra video recording space can be assured on HDD recorder unit 700 by the size of files thrown into the trash icon.

Alternatively, a long TV program that cannot be stored in a single 4.7 GB DVD-RAM disc is air-checked using large-capacity (free space is, e.g., 30 GB) HDD recorder unit 700, and the air-checked long program can be copied from HDD recorder unit 700 onto a plurality of DVD-RAM discs later. In this way, air check can be prevented from being interrupted during a period (several to several ten seconds) required for exchanging discs (or switching video recording discs).

Alternatively, a DVD-VR video signal, DVD-AR audio signal, and DVD-SR stream signal are arbitrarily recorded together in HDD recorder unit 700. After that, only the DVD-VR video signal can be copied from HDD recorder unit 700 onto a given DVD-RAM disc, only the DVD-AR audio signal onto another DVD-RAM disc, and only the DVD-SR stream signal onto still another DVD-RAM disc.

Note that the apparatus shown in FIG. 9 may be exclusively designed for an optical disc recorder without incorporating HDD recorder unit 700, and may have an IEEE1394 interface (or a space and connection slot for mounting an HDD recorder unit later) for connecting HDD recorder unit 700.

The detailed arrangement of the apparatus shown in FIG. 9 is as follows. That is, encoder unit 601 in FIG. 9 comprises A/D converter 614, video encoder 616, audio encoder 617, real-time text (RT_TEXT) encoder 618, formatter 619, and buffer memory 620.

RT_TEXT encoder 618 encodes text input from key input unit 642 or a teletext signal component (or closed caption CC) input from TV tuner 613, and supplies encoded data to formatter 619.

A/D converter 614 receives an external analog video signal+external analog audio signal from AV input unit 612, an analog TV signal+analog audio signal from TV tuner 613, an analog audio signal from microphone 641, or the like. A/D converter 614 converts an input analog video signal into a digital signal (e.g., a sampling rate=13.5 MHz and the number of quantization bits=8). The digital video signal is sent to formatter 619 via selector 615 and video encoder 616.

Likewise, A/D converter 614 converts an input analog audio signal into a digital signal (e.g., a sampling rate=48 kHz and the number of quantization bits=16). The digital audio signal is encoded (e.g., MPEG, AC-3, linear PCM, or the like) by audio encoder 617, and the encoded digital audio signal is supplied to formatter 615.

Note that video encoder 614 has a function of converting an input digital video signal into a digital signal compressed at a variable bit rate on the basis of the standards such as MPEG2 or the like. Also, audio encoder 617 has a function of converting an input digital audio signal into a digital signal compressed at a fixed bit rate (or linear PCM digital signal) on the basis of standards such as MPEG, AC-3, or the like.

Formatter 619 also receives still picture data compressed by JPEG (or motion JPEG) from digital camera (digital still camera) 640 as needed. Furthermore, formatter 619 can receive a digital bitstream (MPEG transport packets) from STB 603 as needed.

STB 603 not only directly sends an MPEG transport stream of satellite digital broadcast received by satellite antenna 621 to formatter 619 but also can decode the MPEG transport stream (expansion of compressed information or the like) and can output corresponding digital audio signal 622 and corresponding digital video signal 623. Digital video signal 623 from STB 603 can be transferred to video encoder 616 via selector 615, and digital audio signal 622 from STB 603 can be transferred to D/A converter 632 in decoder unit 602.

Formatter 619 executes predetermined signal processes of the input video signal, audio signal, text signal, and the like using buffer memory 620 as a work area, and outputs recording data that matches a predetermined format (file structure) to data processor (D-PRO) 610.

Standard encode process contents for generating the recording data will be briefly explained below. That is, when encoder unit 601 in FIG. 9 starts an encode process, parameters required for encoding video data and the like are set. Main picture data is pre-encoded using the set parameters to calculate an optimal code amount distribution for a predetermined average transfer rate (recording rate). Based on the code amount distribution obtained by pre-encoding, the main picture data is encoded. At this time, the audio data is encoded at the same time.

As a result of pre-encoding, when data compression is insufficient (when a desired video program cannot be stored in a DVD-RAM, DVD-RW, or DVD-R disc used to record data), if pre-encoding can be done again (for example, if the recording source is the one capable of repetitive reproduction such as a video tape, video disc, or the like), the main picture data is partially re-encoded, and the re-encoded main picture data portion replaces the previously pre-encoded main picture data portion. With a series of such processes, the main picture data and audio data are encoded, and the average bit rate value required for recording is reduced largely.

Likewise, parameters required for encoding real-time text data are set, and encoded RT_TEXT data is generated.

The encoded main picture data, audio data, and RT_TEXT data are combined and converted into the RTR-DVD video structure.

The encoded main picture data, audio data, and RT_TEXT data are broken up into packs each having a predetermined size (2,048 bytes). Dummy packs (not shown) can be inserted into these packs as needed. Note that packs other than dummy packs describe time stamps such as PTS (presentation time stamp), DTS (decode time stamp), and the like as needed.

Data cells are arranged for respective data units (video object unit VOBU, audio object unit AOBU, stream object unit SOBU) to allow reproduction in the order of their time codes, thus forming objects (video object VOB, audio object AOB, stream object SOB) each constructed by a plurality of cells. A ~.VRO file, ~.ARO file, ~.SRO file, and the like each of which combines one or more VOBs/AOBs/SOBs are formatted to have the directory structure shown in FIG. 2 or 15.

When a DVD video reproduction signal can be digitally copied, since the contents of cells, program chain, management tables, time stamps, and the like are predetermined, they need not be generated again. When an RTR-DVD video recorder is designed to digitally copy a DVD reproduction signal, appropriate copyright protection means must be taken.

To disc drive 609 that writes/reads (records and/or reproduces) information to/from DVD disc (DVD-RAM, DVD-RW, DVD-R, DVD-ROM) 100, D-PRO 610, temporary storage 611, system time counter (or system time clock) STC 650, and the like are connected.

To this STC 650, sub STC1 651 and STC2 652 are further connected. These STC1 651 and STC2 652 can generate clock signals different from that generated by STC 650 after they are reset (or set with times) by STC 650 as needed.

D-PRO 610 supplies RTR-DVD recording data from encoder unit 601 to disc drive 609 and/or HDD recorder unit 700, reads out an RTR-DVD reproduction signal from disc 100 or HDD recorder unit 700, rewrites management information (some file data in FIG. 2 or 15) recorded on disc 100, and deletes data (some or all files) recorded on disc 100 (i.e., executes a process for throwing files into the trash icon) under the control of main MPU unit 604.

Temporary storage 611 is used to buffer a predetermined amount of those of data to be written in disc 100 via disc drive 609 (i.e., data output from encoder unit 601), and to buffer a predetermined amount of those of data reproduced from disc 100 via disc drive 609 (i.e., data input to decoder unit 602).

For example, when temporary storage 611 is comprised of a 4-Mbyte semiconductor memory (DRAM), it can buffer recording or reproduction data for approximately 8 sec at an average recording rate of 4 Mbps. On the other hand, when temporary storage 611 is comprised of a 16-Mbyte EEPROM (flash memory), it can buffer recording or reproduction data for approximately 30 sec at an average recording rate of 4 Mbps. Furthermore, some recording area of HDD recorder unit 700 can be used to buffer reproduction data.

Temporary storage 611 (or HDD recorder unit 700) can also be used to temporarily store video recording information until disc 100 is exchanged by a new one, when disc 100 has been fully recorded during recording.

Temporary storage 611 can be used to temporarily store data excessively read out from a normal drive within a predetermined period of time when disc drive 609 uses a high-speed drive (double-speed or higher). When read data upon reproduction is buffered on temporary storage 611, even when an optical pickup (not shown) has produced read errors due to a vibration shock or the like, reproduction data buffered on temporary storage 611 can be used instead, thus preventing the reproduced picture from being interrupted.

When the RTR-DVD video recorder has an external card slot (not shown in FIG. 9), the EEPROM may be sold as an optional IC card. On the other hand, when the RTR-DVD video recorder has an external drive slot or USB interface, the HDD can be sold as an optional expansion drive.

When an RTR-DVD video recorder is implemented by software using a personal computer with a DVD-RAM drive (not shown), the free space of a hard disc drive or a main memory of the personal computer itself can be partially used as temporary storage 611 in FIG. 9.

Main MPU unit 604 in FIG. 9 includes ROM 6040 written with firmware that implements generation control of video-audio related data, ROM 6042 written with firmware that implements reproduction control of video-audio related data, ROM 6044 written with firmware that implements partial erase control of video-audio related data, a program ROM (not shown) written with other control programs and the like, a character ROM (not shown), work RAM 604a that provides a work area required to execute programs (firmware), and the like, in addition to a microcomputer (MPU or CPU) as its core.

The MPU in main MPU unit 604 executes processes in FIGS. 10 to 17 (to be described later) and the like using its RAM as a work area in accordance with the control programs stored in its ROMs.

In these processes, data (various process commands, the recording time of still pictures to be successively fetched, still picture successive fetch start command, text input associated with video recording contents, and the like) input by the user of the RTR-DVD video recorder are sent from key input unit 607 to main MPU unit 604. As key input unit 607, a keyboard of a personal computer, cursor keys/ten-key pad of a remote controller, or the like (not shown) may be used.

Of the execution results of main MPU unit 604, the contents that the RTR-DVD video recorder user is informed of are displayed on display unit 608 of the RTR-DVD video recorder. The informed contents are displayed as needed on a monitor display using an on-screen display (OSD) mode or the like.

The control timings of disc drive 609, D-PRO 610, and encoder unit 601 and/or decoder unit 602 by main MPU unit 604 can be determined based on time data output from STC 650. (Recording and reproduction are normally done in synchronism with time clocks from STC 650, but other processes may be executed at timings independently of STC 650. Such independent timings can be obtained from sub STC1 651 and/or STC2 652.)

Also, main MPU unit 604 can execute processes of the video recording dates of programs recorded on disc 100, registration dates of entry points, and the like on the basis of time data from a timer clock generator (not shown).

Decoder unit 602 in FIG. 9 comprises separator 625 for separating and extracting packs from RTR-DVD reproduction data with a predetermined pack structure, memory 626 used upon signal processes such as pack separation and the like, video decoder 628 for decoding main picture data (the contents of video packs) separated by separator 625, RT_TEXT decoder 629 for decoding real-time text separated by separator 625, audio decoder 630 for decoding audio data (the contents of audio packs) separated by separator 625, video processor (V-PRO) 638 for appropriately synthesizing video data from video decoder 628 and real-time text data from RT_TEXT decoder 629 and outputting composite data, and D/A converter (for audio) 632 for converting a digital audio output from audio decoder 630 into an analog audio signal.

Note that video decoder 628 may include a reduced-scale picture (thumbnail picture) generator (not shown). The thumbnail picture generator reduces read image data and transfers it to frame memory 606, thus outputting a reduced-scale picture (thumbnail picture) to external monitor TV 637.

Main picture data (containing thumbnail picture data as needed) output from V-PRO 638 and OSD data (text or the like) supplied as needed from main MPU unit 604 are input to video mixing unit 605. This OSD data is superimposed on the main picture data from V-PRO 638 on frame memory 606. The main picture data superimposed with the OSD data is output from video mixing unit 605.

The digital video output from video mixing unit 605 is supplied to external personal computer (PC) 625 or the like via digital output I/F 634, and is converted into an analog video signal by D/A converter 636 and is supplied to external monitor TV 637. Various kinds of text information and the like are then displayed on TV 637 together with a main picture.

The digital audio output from audio decoder 630 is externally output via digital output I/F 631, and is converted into an analog audio signal by D/A converter 632 and is supplied to external loudspeaker 633.

Figure 10:
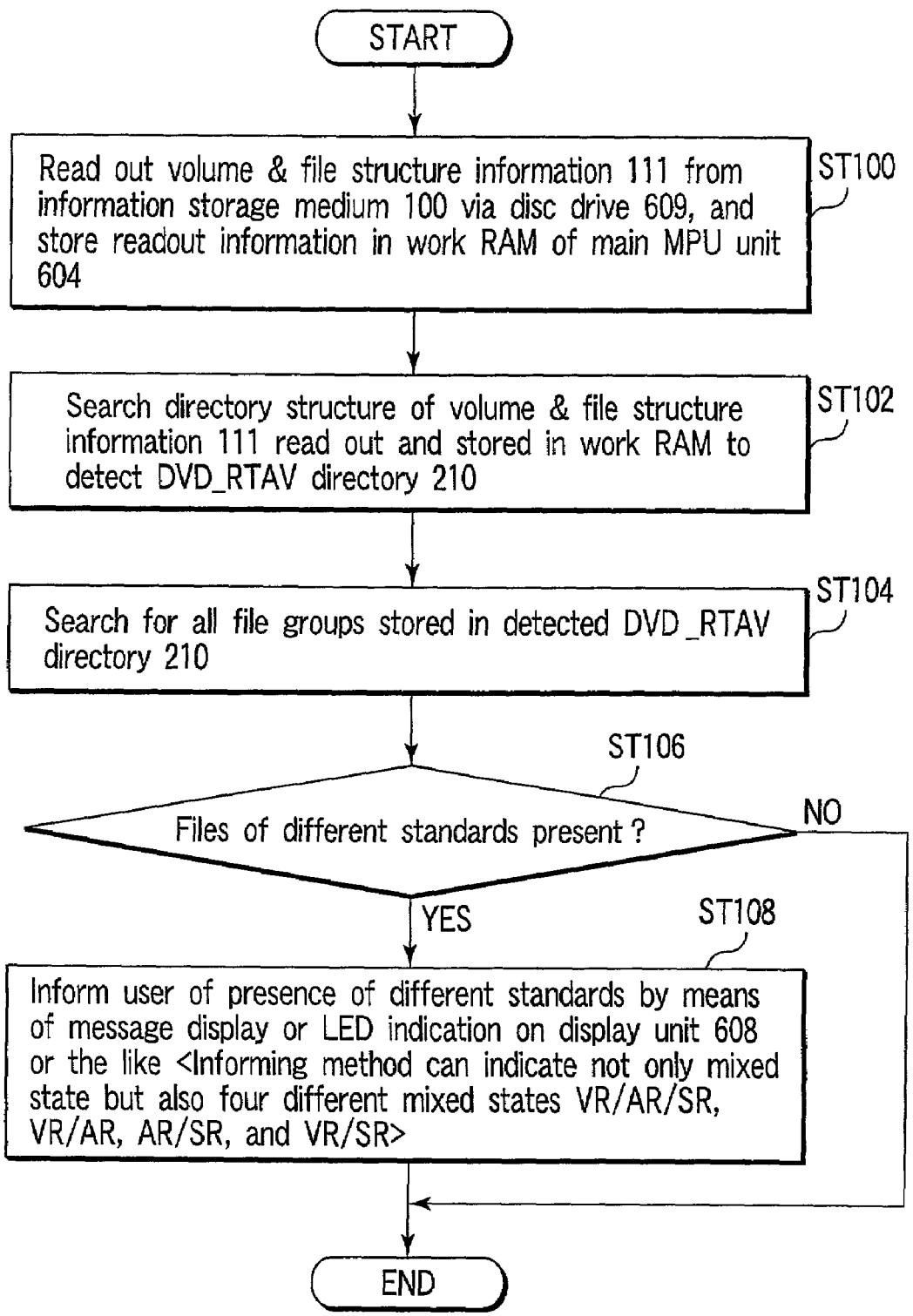
FIG. 10 is a flow chart for explaining the processing for, when an information medium that can record a plurality of kinds of multi-standard contents information (VR/AR/SR data) together is set in the apparatus exemplified in FIG. 9, and two or more kinds of multi-standard contents information are recorded together on the single information medium, informing the apparatus user of that message (two or more kinds of multi-standard contents information are recorded together and/or their mixed recording state)

FIG. 10 is a flow chart for explaining the processing for, when an information medium (100, 700, and the like in FIG. 9) that can record a plurality of kinds of multi-standard contents information (VR/AR/SR data) together is set in the apparatus exemplified in FIG. 9, and two or more kinds of multi-standard contents information are recorded together on the single information medium, informing the apparatus user of that message (two or more kinds of multi-standard contents information are recorded together and/or their mixed recording state).

When information storage medium 100 is set in the information recording/reproduction apparatus in FIG. 9, volume & file structure information 111 as file management information is read out from information storage medium 100 via disc drive 609, and is stored in work RAM 604a of main MPU unit 604 (step ST100).

Volume & file structure information 111 stored in work RAM 604a is searched for directory information, thus detecting DVD_RTAV directory 210 (step ST102).

Subsequently, all file groups in detected DVD_RTAV directory 210 are searched to discriminate their file types (discriminated by, e.g., file names "VR_*.VRO", "AR_*.ARO", and the like) (step ST104).

Based on the discrimination results of the file types, it is checked if files of different standards are present in DVD_RTAV directory 210 (step ST106).

As a result of checking, if files of different standards are present in DVD_RTAV directory 210 (YES in step ST106), the user is informed by message display using display unit 608 or the like and/or LED ON indication or the like that files of different standards are stored together (step ST108).

As the user informing method, not only the mixed state is indicated but also, mixed states of all four combinations VR/AR/SR, VR/AR, AR/SR, and VR/SR may be indicated.

Also, in an embodiment of the present invention, the information recording/reproduction apparatus compatible with a plurality of standards may read out management information (130, 140, and 150) of different standards, and may display their play lists as a menu on a single screen (not shown).

Figure 11:
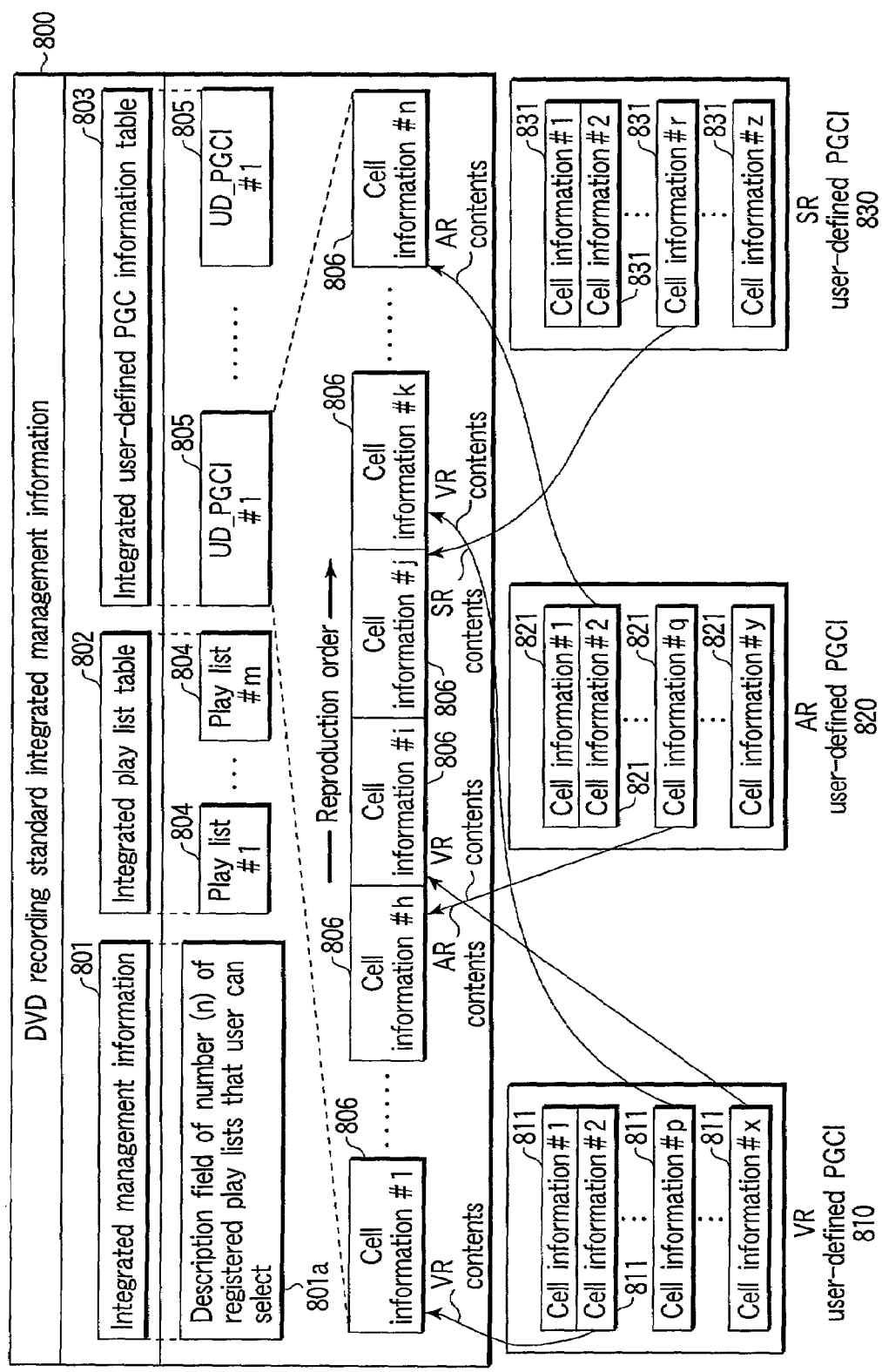
FIG. 11 is a view for explaining the data structure of integrated management information 800 according to an embodiment of the present invention, which can integrate and manage an arbitrary reproduction sequence of a plurality of kinds of multi-standard contents information (VR/AR/SR data)

FIG. 11 is a view for explaining the data structure of integrated management information 800 according to an embodiment of the present invention, which can integrate and manage an arbitrary reproduction sequence of a plurality of kinds of multi-standard contents information (VR/AR/SR data).

As shown in FIG. 11, DVD recording standard integrated management information 800 is comprised of integrated management information 801 for managing entire information that integrates and manages three different DVD recording standards, integrated play list table 802, and integrated user-defined PGC information table 803.

Integrated management information 801 contains description field 801*a* of the number (n) of registered play lists that the user can select. Integrated play list table 802 contains a plurality of play lists 804 that allow the user to selectively reproduce data. Integrated user-defined PGC information table 803 contains a plurality of pieces of user-defined PGC information (UD_PGCI) 805 which arbitrarily combine contents information of respective standards to specify their reproduction order. When UD_PGCI 805 is registered in one of play lists 804, the user can selectively reproduce data.

Each of PGC information 810, PGC information 820, and PGC information 830 stored in management information of the respective standards is management information indicating a reproduction sequence in the corresponding standards. Each of cell information 811, cell information 821, and cell information 831 is management information indicating a reproduction unit in the corresponding standards. Cell information 806 is management information (containing information of cell type 455 in FIG. 6) indicating a reproduction unit copied from the corresponding standards, and is stored in UD_PGCI 805.

As information indicating a combination and order of reproduction, cell type information and a number indicating the reproduction order in each of cell information 811, cell information 821, and cell information 831 stored in the corresponding standards may be registered as standard integrated management information 800 (not shown).

With standard integrated management information 800 above, a plurality of pieces of contents information of respective standards can be arbitrarily combined and undergo reproduction management.

Figure 12:
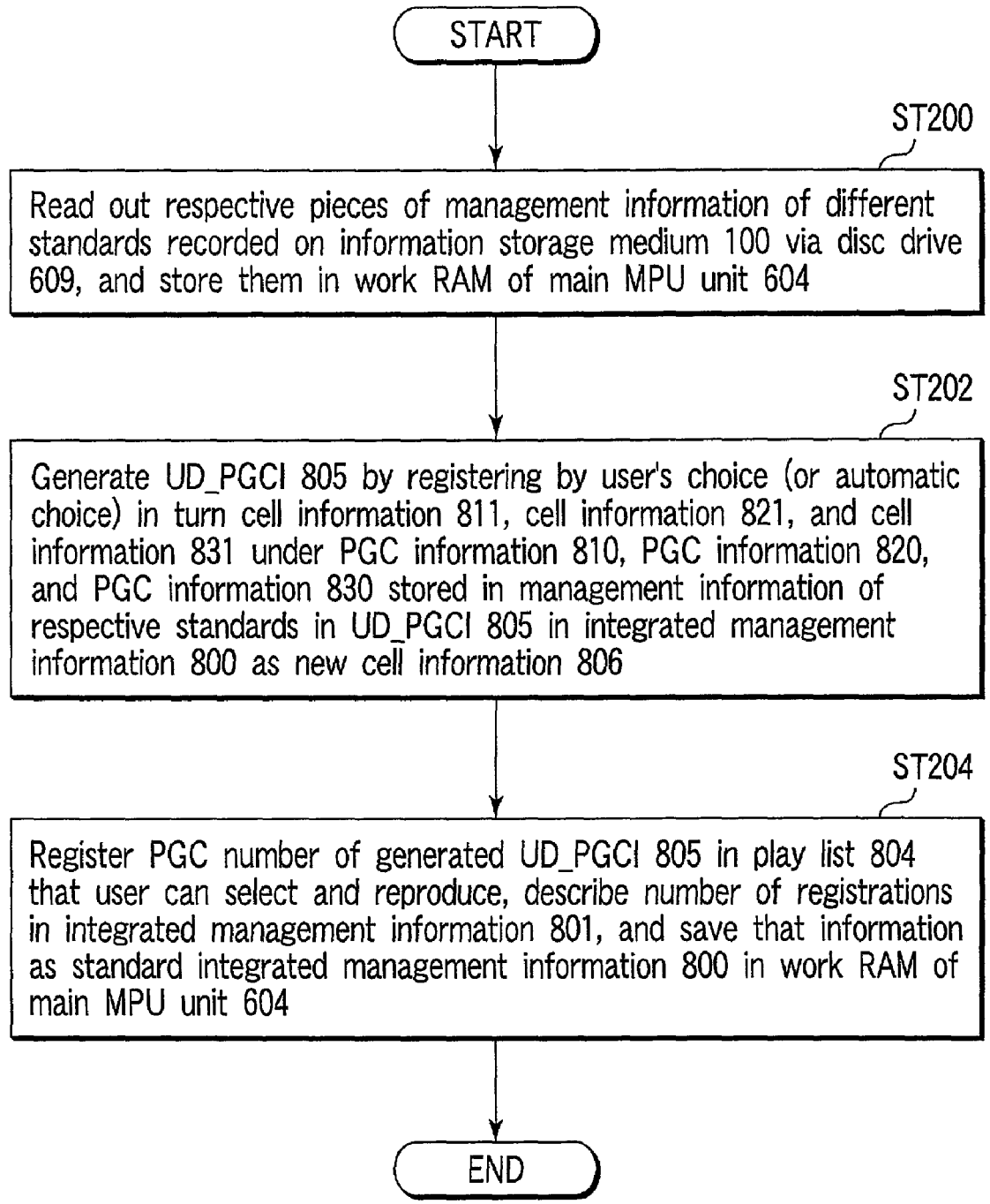
FIG. 12 is a flow chart for explaining an example of the generation sequence (integrated management information forming method) of integrated management information 800 shown in FIG. 11.

FIG. 12 is a flow chart for explaining an example of the generation sequence of integrated management information 800 in FIG. 11.

A plurality of pieces of management information of different standards recorded on information storage medium 100 are read out via disc drive 609, and are stored in work RAM 604*a* of main MPU unit 604 (step ST200).

Cell information 811, cell information 821, and cell information 831 under PGC information 810, PGC information 820, and PGC information 830 stored in management information of the respective standards are acquired, and are displayed as a menu so that the user can select them. Each cell information of user's choice (or automatic choice) is registered in turn as new cell information 806 in UD_PGCI 805 in integrated management information 800. In this way, UD_PGCI 805 that specifies the integrated reproduction sequence among different standards is generated (step ST202).

A PGC number of UD_PGCI 805 generated in this manner is registered in play list 804 that allows the user to selectively reproduce data. The number of registrations registered in the integrated management information is described in integrated management information 801, which is saved as standard integrated management information 800 in work RAM 604*a* of main MPU unit 604 (step ST204).

Figure 13:
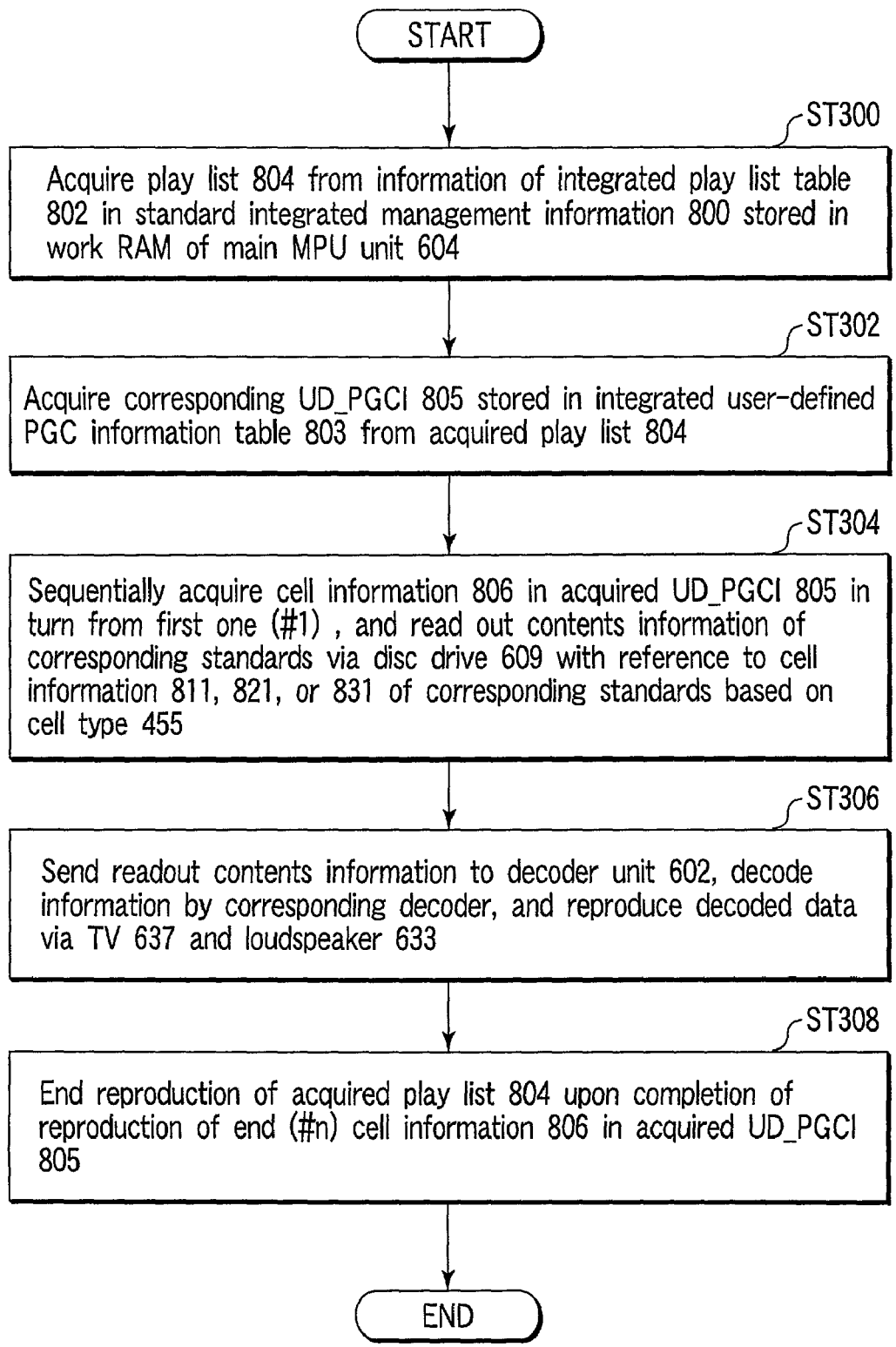
FIG. 13 is a flow chart for explaining an example of the reproduction sequence when a plurality of kinds of multi-standard contents information (VR/AR/SR data) are reproduced using integrated management information 800 shown in FIG. 11.

FIG. 13 is a flow chart for explaining an example of the reproduction sequence when a plurality of kinds of multi-standard contents information (VR/AR/SR data) are reproduced by the apparatus shown in FIG. 9 using integrated management information 800 shown in FIG. 11 which is generated in the sequence shown in FIG. 12, and is held in work RAM 604*a* in main MPU unit 604 in FIG. 9.

In the information recording/reproduction apparatus shown in FIG. 9, play list 804 is acquired from information of integrated play list table 802 in standard integrated management information 800 stored in work RAM 604*a* in main MPU unit 604 after the processing steps shown in FIG. 12 (step ST300).

UD_PGCI 805 (corresponding to the acquired play list) stored in integrated user-defined PGC information table 803 is acquired from acquired play list 804 (step ST302).

Subsequently, cell information 806 in acquired UD_PGCI 805 is acquired in turn from the start one (#1). Then, the standards to be referred to are checked based on cell type 455, and contents information of the corresponding standards is read out via disc drive 609 with reference to cell information 811, 821, or 831 of the corresponding standards (step ST304).

The readout contents information is decoded by the corresponding decoder (one of 628 to 630), and is displayed/reproduced via TV 637 and loudspeaker 633 (step ST306).

Upon completion of reproduction of end (#n) cell information 806 in acquired UD_PGCI 805, reproduction of acquired play list 804 is complete (step ST308).

Note that the user can select play list 804 to be reproduced as follows. That is, a select menu of one or more play lists 804 is formed in the reproduction apparatus on the basis of information of integrated play list table 802 in standard integrated management information 800. The formed user select menu is displayed using display unit 608, TV 637, or the like (not shown), and the user can select a play list to be reproduced from that menu.

Figure 14:
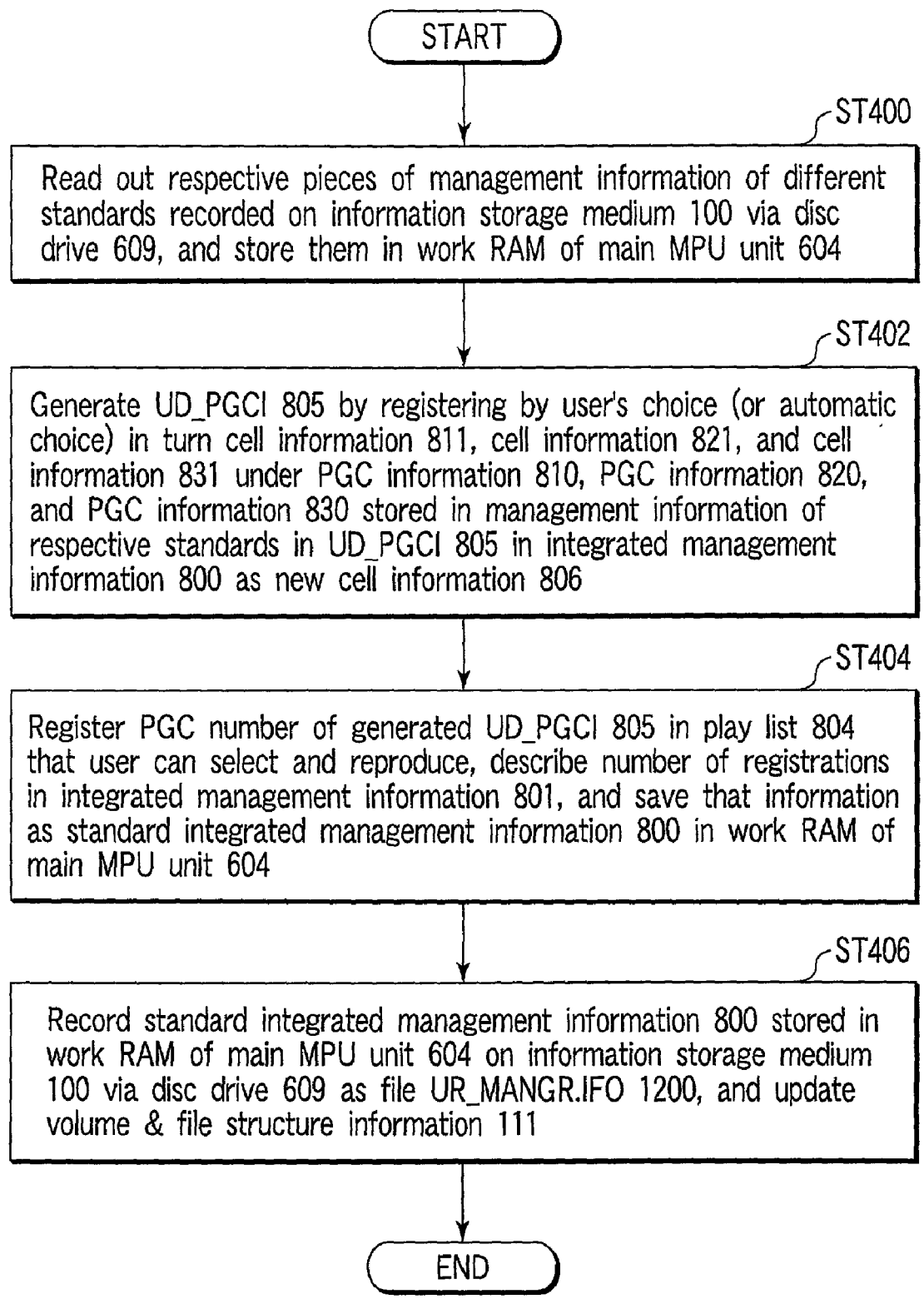
FIG. 14 is a flow chart for explaining an example of the processing sequence (integrated management information recording method) when integrated management information 800 shown in FIG. 11 is generated and recorded on the information storage medium shown in FIG. 1.

FIG. 14 is a flow chart for explaining an example of the processing sequence when integrated management information 800 shown in FIG. 11 is generated and recorded on information storage medium 100 shown in FIG. 1.

In the information recording/reproduction apparatus shown in FIG. 9, a plurality of pieces of management information of different standards recorded on information storage medium 100 are read out via disc drive 609, and are stored in work RAM 604*a* of main MPU unit 604 (step ST400).

Cell information 811, cell information 821, and cell information 831 under PGC information 810, PGC information 820, and PGC information 830 stored in management information of the respective standards are acquired, and the contents of the acquired cell information are displayed as a menu so that the user can select them. Each cell information of user's choice (or automatic choice) is registered in turn as new cell information 806 in UD_PGCI 805 in integrated management information 800. In this way, UD_PGCI 805 that specifies the integrated reproduction sequence among different standards is generated (step ST402).

A PGC number of UD_PGCI 805 generated in this manner is registered in play list 804 that allows the user to selectively reproduce data. The number of registrations registered in the integrated management information is described in integrated management information 801, which is saved as standard integrated management information 800 in work RAM 604*a* of main MPU unit 604 (step ST404).

Standard integrated management information 800 stored in work RAM 604*a* of main MPU unit 604 is recorded as integrated management information file UR_MANGR.IFO 1200 (see FIG. 15) on information storage medium 100 via disc drive 609. Volume & file structure information 111 in information storage medium 100 is updated in correspondence with the recorded UR_MANGR.IFO (step ST406).

In the example shown in FIG. 14, standard integrated management information 800 is recorded as the integrated management information UR_MANGR.IFO file. Alternatively, this standard integrated management information 800 can be recorded and saved in manufacturer information tables (MNFIT) 306 and 316 shown in FIGS. 3 and 4 (if a free space is available).

Figure 15:
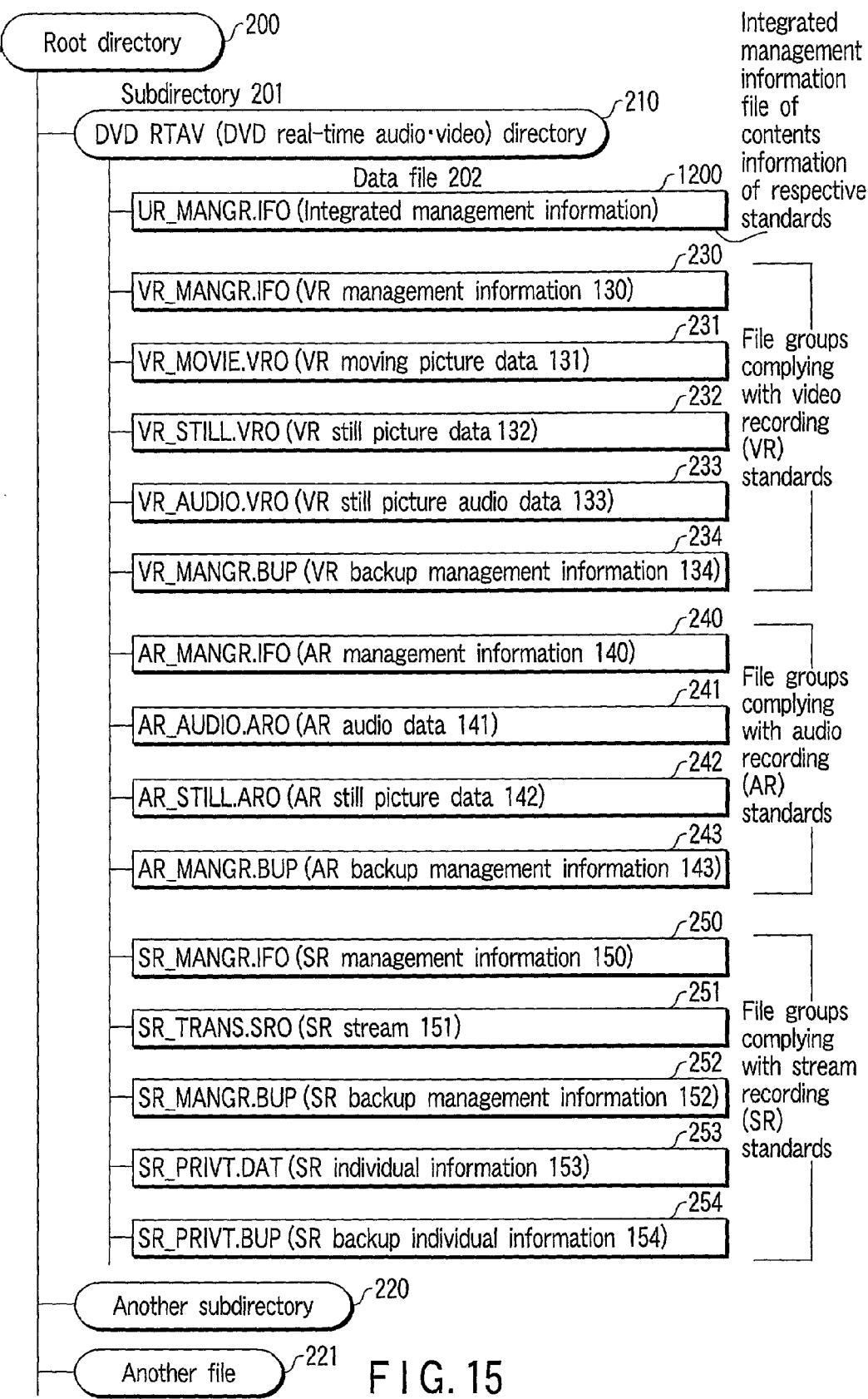
FIG. 15 is a view showing an example of the directory structure of an integrated management information file (UR_MANGR.IFO) which is recorded in volume & file structure information in the information storage medium shown in FIG. 1, and is used to integrate and manage files specified by three different DVD recording standards (VR/AR/SR standards), and the reproduction sequence of these files.

FIG. 15 shows an example of the directory structure of the integrated management information file (UR_MANGR.IFO 1200) which is recorded in volume & file structure information 111 in information storage medium 100 shown in FIG. 1, and is used to integrate and manage files specified by three different DVD recording standards (VR/AR/SR standards), and the reproduction sequence of these files. FIG. 15 shows the structure obtained by adding integrated management information UR_MANGR.IFO 1200 to DVD_RTAV directory 210 in FIG. 2.

Figure 16:
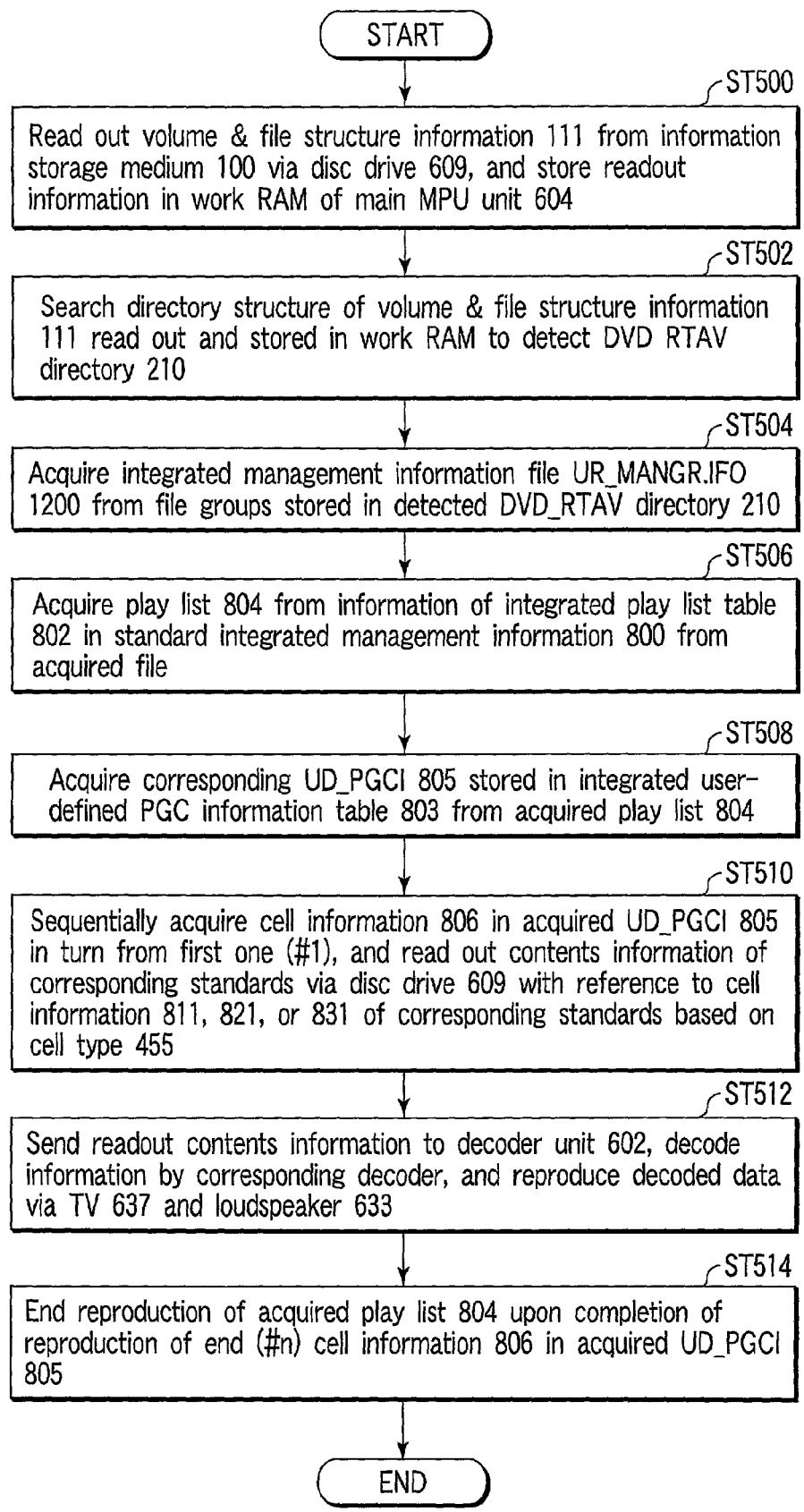
FIG. 16 is a flow chart for explaining an example of the reproduction sequence upon reproducing a plurality of kinds of multi-standard contents information (VR/AR/SR data) by reading out the integrated management information from the information storage medium shown in FIG. 1 that records the integrated management information shown in FIG. 11.

FIG. 16 is a flow chart for explaining an example of the reproduction sequence upon reproducing a plurality of kinds of multi-standard contents information (VR/AR/SR data) by reading out integrated management information 800 from information storage medium 100 shown in FIG. 1 that records integrated management information 800 shown in FIG. 11.

Volume & file structure information 111 is read out from information storage medium 100 that records standard integrated management information 800 as standard management information file UR_MANGR.IFO 1200 via disc drive 609, and is stored in work RAM 604*a* of main MPU unit 604 (step ST500).

The directory structure of volume & file structure information 111 stored in work RAM 604*a* is searched to detect DVD_RTAV directory 210 (step ST502).

Integrated management information file UR_MANGR.IFO 1200 is acquired from file groups stored in detected DVD_RTAV directory 210 (step ST504).

Standard integrated management information 800 is extracted from the acquired file, and play list 804 is acquired from information of integrated play list table 802 in extracted information 800 (step ST506).

Corresponding UD_PGCI 805 stored in integrated user-defined PGC information table 803 is acquired from acquired play list 804 (step ST508).

Cell information 806 in acquired UD_PGCI 805 is acquired in turn from the start one (#1), the standards to be referred to are checked based on cell type 455, and contents information of the corresponding standards is read out via disc drive 609 with reference to cell information 811, 821, or 831 of the corresponding standards (step ST510).

The readout contents information is sent to decoder unit 602, is decoded by the corresponding decoder, and is reproduced via TV 637 and loudspeaker 633 (step ST512).

Upon completion of reproduction of end (#n) cell information 806 in acquired UD_PGCI 805, reproduction of acquired play list 804 is complete (step ST514).

Note that a select menu of play lists 804 may be formed in the reproduction apparatus on the basis of information of integrated play list table 802 in standard integrated management information 800, the formed menu may be displayed on display unit 608, TV 637, or the like, and the user may select play list 804 to be reproduced from that menu.

Figure 17:
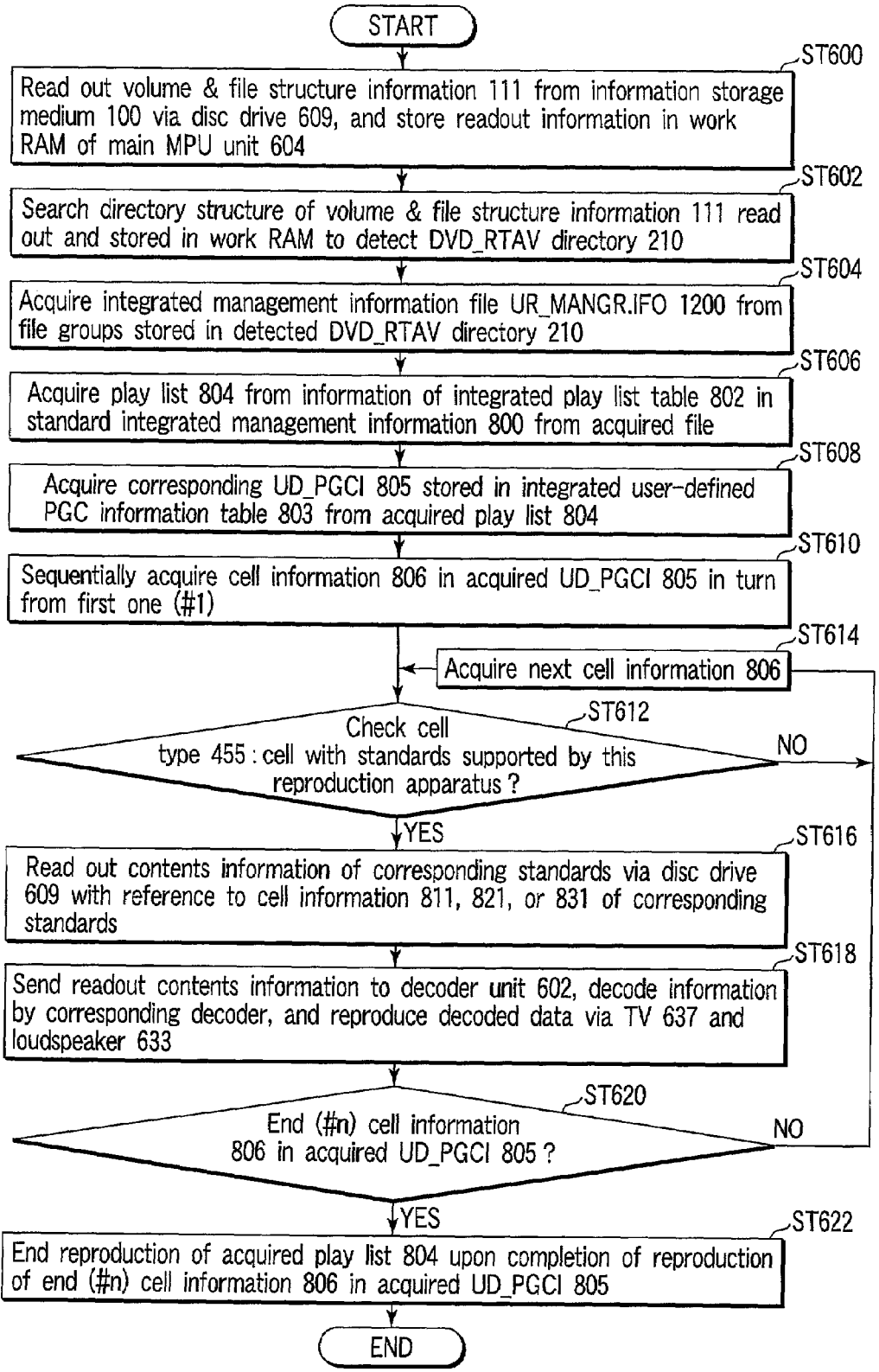
FIG. 17 is a flow chart for explaining another example (skip reproduction method of incompatible standard reproduction unit information) of the reproduction sequence upon reproducing a plurality of kinds of multi-standard contents information (VR/AR/SR data) by reading out the integrated management information from the information storage medium shown in FIG. 1 that records the integrated management information shown in FIG. 11.

FIG. 17 is a flow chart for explaining another example of the reproduction sequence upon reproducing a plurality of kinds of multi-standard contents information (VR/AR/SR data) by reading out integrated management information 800 from information storage medium 100 shown in FIG. 1 that records integrated management information 800 shown in FIG. 11.

Volume & file structure information 111 is read out from information storage medium 100 that records standard integrated management information 800 as standard management information file UR_MANGR.IFO 1200 (FIG. 15) via disc drive 609, and is stored in work RAM 604*a* of main MPU unit 604 (step ST600).

The directory structure of volume & file structure information 111 stored in work RAM 604*a* is searched to detect DVD_RTAV directory 210 (step ST602).

Integrated management information file UR_MANGR.IFO 1200 is acquired from file groups stored in detected DVD_RTAV directory 210 (step ST604).

Standard integrated management information 800 is extracted from the acquired file, and play list 804 is acquired from information of integrated play list table 802 in extracted information 800 (step ST606).

Corresponding UD_PGCI 805 stored in integrated user-defined PGC information table 803 is acquired from acquired play list 804 (step ST608).

Cell information 806 in acquired UD_PGCI 805 is acquired in turn from the start one (#1) (step ST610).

Cell type 455 (see FIG. 6) in acquired cell information 806 is checked to determine if the cell of interest is the one with the standards which are supported (can be reproduced) by the reproduction apparatus (step ST612).

If the cell of interest is not the one with the cell supported by the reproduction apparatus (NO in step ST612), this cell is skipped, and next cell information 806 is acquired (step ST614). The flow returns to step ST612 to proceed with the reproduction process.

If the cell of interest is the one with the cell supported by the reproduction apparatus (YES in step ST612), contents information of the corresponding standards is read out via disc drive 609 with reference to cell information 811, 821, or 831 of the corresponding standards (step ST616).

The readout contents information is sent to decoder unit 602, is decoded by the corresponding decoder, and is reproduced via TV 637 and loudspeaker 633 (step ST618).

It is checked if cell information 806 of interest is end (#n) one in acquired UD_PGCI 805 (step ST620).

If cell information 806 of interest is not end (#n) one (NO in step ST620), next cell information 806 is acquired (step ST614), and the flow returns to step ST612 to proceed with the reproduction process.

If cell information 806 of interest is end (#n) one (YES in step ST620), reproduction of acquired play list 804 is complete upon completion of reproduction of end (#n) cell information 806 in acquired UD_PGCI 805 (step ST622).

As described above, according to an aspect of the present invention, a reproduction apparatus/reproduction method that can make the user recognize the mixed recorded state of contents information of different DVD recording standards when a plurality of pieces of contents information of different DVD recording standards are stored together on a single disc, can be provided.

Also, a reproduction apparatus/reproduction method, recording apparatus/recording method, and information storage medium, which allow the user to arbitrary combine a plurality of pieces of contents information of different DVD recording standards and to designate their reproduction order, can be provided.

Note that the present invention is not limited to the aforementioned embodiments, and various modifications may be made without departing from the scope of the invention when it is practiced. The respective embodiments may be combined as needed as long as possible, and combined effects can be obtained in such case.

Furthermore, the embodiments include inventions of various stages, and various inventions can be extracted by appropriately combining a plurality of required constituent elements disclosed in this application. For example, even when some required constituent requirements are deleted from all the required constituent elements disclosed in the embodiments, an arrangement from which those required constituent elements are deleted can be extracted as an invention if the effect of the present invention is obtained.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An integrated management information forming method for integrating and managing a reproduction sequence of information reproduced from an information medium on which no less than two kinds of multi-standard contents information managed in units of files by file management information, and contents management information thereof are recorded together, comprising:

reading out and storing the contents management information from the information medium;

acquiring contents management information of each multi-standard contents information from the stored contents management information;

selectively acquiring reproduction unit information indicating an arbitrary reproduction period of each multi-standard contents information from the acquired contents management information; and forming integrated management information that integrates and manages mixed reproduction of the multi-standard contents information by combining and registering the selectively acquired reproduction unit information of the multi-standard contents information in an arbitrary reproduction order.

2. An integrated management information saving method for integrating and managing a reproduction sequence of information reproduced from an information medium on which no less than two kinds of multi-standard contents information managed in units of files by file management information, and contents management information thereof are recorded together, comprising:

reading out and storing the contents management information from the information medium;

acquiring contents management information of each multi-standard contents information from the stored contents management information;

selectively acquiring reproduction unit information indicating an arbitrary reproduction period of each multi-standard contents information from the acquired contents management information;

forming integrated management information that integrates and manages mixed reproduction of the multi-standard contents information by combining and registering the selectively acquired reproduction unit information of the multi-standard contents information in an arbitrary reproduction order; and saving the formed integrated management information in a predetermined information storage unit.

3. An information access method, which uses integrated management information, and integrates and manages a reproduction sequence of information reproduced from an information medium on which no less than two kinds of multi-standard contents information managed in units of files by file management information, and contents management information thereof are recorded together, comprising:

reading out and storing the contents management information from the information medium;

acquiring contents management information of each multi-standard contents information from the stored contents management information;

selectively acquiring reproduction unit information indicating an arbitrary reproduction period of each multi-standard contents information from the acquired contents management information;

forming integrated management information that integrates and manages mixed reproduction of the multi-standard contents information by combining and registering the selectively acquired reproduction unit information of the multi-standard contents information in an arbitrary reproduction order; and accessing each multi-standard contents information in accordance with the reproduction order registered in the integrated management information.

4. An integrated management information recording method for recording information on an information medium on which no less than two kinds of multi-standard contents information managed in units of files by file management information, and contents management information thereof are recorded together, comprising:

reading out and storing the contents management information from the information medium;

acquiring contents management information of each multi-standard contents information from the stored contents management information;

selectively acquiring reproduction unit information indicating an arbitrary reproduction period of each multi-standard contents information from the acquired contents management information;

forming integrated management information that integrates and manages mixed reproduction of the multi-standard contents information by combining and registering the selectively acquired reproduction unit information of the multi-standard contents information in an arbitrary reproduction order; and recording the formed integrated management information on the information medium.

5. A method according to claim 4, wherein the integrated management information is recorded as a file managed by the file management information.

6. A reproduction apparatus for reproducing recorded data from an information medium on which multi-standard data managed in units of files by file management information are recorded together, comprising:

a read-out section configured to read out the file management information from the information medium;

a storage section configured to extract directory information of data files recorded in the information medium from the file management information read out by said read-out section, and storing the directory information;

a checking section configured to check a file type in specific directory information from the directory information stored in said storage section; and output section configured to, if it is determined as a result of checking of said checking section that no less than two different multi-standard data files are present, output information indicating that the multi-standard data are recorded together on the information medium.

7. An apparatus according to claim 6, wherein if it is determined as a result of checking of said checking section that no less than two different multi-standard data files are present, said output section displays information indicating a mixed combination state of the multi-standard data recorded together on the information medium.

8. An information forming apparatus for integrating and managing a reproduction sequence of information reproduced from an information medium on which no less than two kinds of multi-standard contents information managed in units of files by file management information, and contents management information thereof are recorded together, comprising:
   a read-out/storage section configured to read out and storing the contents management information from the information medium;
   an acquisition section configured to acquire contents management information of each multi-standard contents information from the contents management information stored in said read-out/storage section;
   a selective acquisition section configured to selectively acquire reproduction unit information indicating an arbitrary reproduction period of each multi-standard contents information from the contents management information acquired by said acquisition section; and
   a forming section configured to form integrated management information that integrates and manages mixed reproduction of the multi-standard contents information by combining and registering the reproduction unit information of the multi-standard contents information selectively acquired by said selective acquisition section in an arbitrary reproduction order.

9. An information saving apparatus for integrating and managing a reproduction sequence of information reproduced from an information medium on which no less than two kinds of multi-standard contents information managed in units of files by file management information, and contents management information thereof are recorded together, comprising:
   a read-out/storage section configured to read out and storing the contents management information from the information medium;
   an acquisition section configured to acquire contents management information of each multi-standard contents information from the contents management information stored in said read-out/storage section;
   a selective acquisition section configured to selectively acquire reproduction unit information indicating an arbitrary reproduction period of each multi-standard contents information from the contents management information acquired by said acquisition section;
   a forming section configured to form integrated management information that integrates and manages mixed reproduction of the multi-standard contents information by combining and registering the reproduction unit information of the multi-standard contents information selectively acquired by said selective acquisition section in an arbitrary reproduction order; and
   a saving section configured to save the formed integrated management information in a predetermined information storage unit.

10. An information access apparatus, which uses integrated management information, and integrates and manages a reproduction sequence of information reproduced from an information medium on which no less than two kinds of multi-standard contents information managed in units of files by file management information, and contents management information thereof are recorded together, comprising:
   a read-out/storage section configured to read out and storing the contents management information from the information medium;
   an acquisition section configured to acquire contents management information of each multi-standard contents information from the contents management information stored in said read-out/storage section;
   a selective acquisition section configured to selectively acquire reproduction unit information indicating an arbitrary reproduction period of each multi-standard contents information from the contents management information acquired by said acquisition section;
   a forming section configured to form integrated management information that integrates and manages mixed reproduction of the multi-standard contents information by combining and registering the reproduction unit information of the multi-standard contents information selectively acquired by said selective acquisition section in an arbitrary reproduction order; and
   an access section configured to access each multi-standard contents information in accordance with the reproduction order registered in the integrated management information formed by said forming section.

11. An information recording apparatus for recording information on an information medium on which no less than two kinds of multi-standard contents information managed in units of files by file management information, and contents management information thereof are recorded together, comprising:
   a read-out section configured to read out and storing the contents management information from the information medium;
   an acquisition section configured to acquire contents management information of each multi-standard contents information from the contents management information read out by said read-out section;
   a selective acquisition section configured to selectively acquire reproduction unit information indicating an arbitrary reproduction period of each multi-standard contents information from the contents management information acquired by said acquisition section;
   a forming section configured to form integrated management information that integrates and manages mixed reproduction of the multi-standard contents information by combining and registering the reproduction unit information of the multi-standard contents information selectively acquired by said selective acquisition section in an arbitrary reproduction order; and
   a recording section configured to record the integrated management information formed by said forming section on the information medium.

12. An apparatus according to claim 11, wherein the integrated management information is recorded as a file managed by the file management information.

* * * * *